US009446983B2

(12) United States Patent
Li et al.

(10) Patent No.: US 9,446,983 B2
(45) Date of Patent: *Sep. 20, 2016

(54) GLASS COMPOSITIONS AND FIBERS MADE THEREFROM

(71) Applicant: PPG Industries Ohio, Inc., Cleveland, OH (US)

(72) Inventors: Hong Li, Sewickley, PA (US); James C. Watson, Lake Wylie, SC (US)

(73) Assignee: PPG Industries Ohio, Inc., Cleveland, OH (US)

( * ) Notice: Subject to any disclaimer, the term of this patent is extended or adjusted under 35 U.S.C. 154(b) by 131 days.

This patent is subject to a terminal disclaimer.

(21) Appl. No.: 13/756,603

(22) Filed: Feb. 1, 2013

(65) Prior Publication Data

US 2013/0143459 A1 Jun. 6, 2013

Related U.S. Application Data

(63) Continuation-in-part of application No. 13/365,590, filed on Feb. 3, 2012, which is a continuation-in-part of application No. 12/534,490, filed on Aug. 3, 2009.

(60) Provisional application No. 61/594,426, filed on Feb. 3, 2012.

(51) Int. Cl.
| C03C 13/00 | (2006.01) |
| C03C 13/06 | (2006.01) |
| D03D 15/00 | (2006.01) |
| D04H 13/00 | (2006.01) |
| C08J 5/04 | (2006.01) |

(52) U.S. Cl.
CPC ............. *C03C 13/00* (2013.01); *C03C 13/06* (2013.01); *C08J 5/043* (2013.01); *D03D 15/0011* (2013.01); *D04H 13/008* (2013.01); *Y10T 442/2992* (2015.04); *Y10T 442/30* (2015.04); *Y10T 442/60* (2015.04)

(58) Field of Classification Search
CPC ........ C03C 13/00; C03C 13/06; C08J 5/043; D03D 15/0011; D04H 13/008; C08K 7/14
USPC .................................................... 501/35, 36
See application file for complete search history.

(56) References Cited

U.S. PATENT DOCUMENTS

| 2,467,889 A | 4/1949 | Harter et al. |
| 2,576,312 A | 11/1951 | Minnick |
| 3,007,806 A | 11/1961 | Hartwig |
| 3,008,841 A | 11/1961 | Tiede |
| 3,945,838 A | 3/1976 | Erickson et al. |
| 3,985,935 A | 10/1976 | Brodmann |
| 4,026,715 A | 5/1977 | Erickson et al. |
| 4,055,434 A | 10/1977 | Chen et al. |
| 4,087,285 A | 5/1978 | Kurz |
| 4,095,986 A | 6/1978 | Matsuda et al. |
| 4,140,533 A | 2/1979 | Ohtomo et al. |
| 4,233,379 A | 11/1980 | Gross et al. |
| 4,249,991 A | 2/1981 | Baes et al. |
| 4,366,251 A | 12/1982 | Rapp |
| 4,495,298 A | 1/1985 | Yamagishi et al. |
| 4,557,973 A | 12/1985 | Ali |
| 4,764,487 A | 8/1988 | Lewis |
| 4,867,779 A | 9/1989 | Meunier et al. |
| 4,920,080 A | 4/1990 | Demarest, Jr. |
| 5,037,470 A | 8/1991 | Matzen et al. |
| 5,064,780 A | 11/1991 | Grijol et al. |
| 5,420,082 A | 5/1995 | Maugendre et al. |
| 5,641,347 A | 6/1997 | Grabowski et al. |
| 5,658,836 A | 8/1997 | Rapp et al. |
| 5,691,255 A | 11/1997 | Jensen et al. |
| 5,714,421 A | 2/1998 | Olds et al. |
| 5,843,854 A | 12/1998 | Karppinen et al. |
| 5,932,499 A | 8/1999 | Xu et al. |
| 6,060,413 A | 5/2000 | Bernard et al. |
| 6,077,798 A | 6/2000 | Rapp |
| 6,128,430 A | 10/2000 | Chu et al. |
| 6,264,961 B1 | 7/2001 | Ansmann |
| 6,265,335 B1 | 7/2001 | Oleske et al. |
| 6,284,684 B1 | 9/2001 | Vignesoult et al. |
| 6,297,182 B1 | 10/2001 | Maeda et al. |
| 6,346,568 B1 | 2/2002 | Maeda et al. |
| 6,624,103 B2 | 9/2003 | Jantzen et al. |

(Continued)

FOREIGN PATENT DOCUMENTS

| BE | 849501 | 4/1977 |
| CN | 1196002 | 4/2005 |

(Continued)

OTHER PUBLICATIONS

Patent Cooperation Treaty, International Preliminary Report on Patentability, International Application No. PCT/US2013/024271, dated Aug. 14, 2014.

Patent Cooperation Treaty, International Search Report and Written Opinion, International Application No. PCT/US2013/024271, dated Jun. 13, 2013.

United States Patent and Trademark Office, Amendment and Response to Office Action, U.S. Appl. No. 13/365,590, filed Dec. 2, 2014.

United States Patent and Trademark Office, Amendment and Response to Office Action, U.S. Appl. No. 13/365,590, filed Aug. 13, 2014.

United States Patent and Trademark Office, Amendment and Response to Office Action, U.S. Appl. No. 13/365,590 mailed Apr. 10, 2014.

(Continued)

*Primary Examiner* — Elizabeth A Bolden
(74) *Attorney, Agent, or Firm* — Kilpatrick Townsend & Stockton LLP

(57) ABSTRACT

Some embodiments of the present invention provide fiberizable glass compositions formed from batch compositions comprising amounts of one or more glassy minerals, including perlite and/or pumice. Some embodiments of the present invention related to glass fibers formed from such batch compositions, and composites and other materials incorporating such glass fibers.

22 Claims, 13 Drawing Sheets

(56) References Cited

U.S. PATENT DOCUMENTS

| | | | |
|---|---|---|---|
| 6,630,419 B2 | 10/2003 | Jantzen et al. | |
| 6,809,050 B1 | 10/2004 | McGinnis | |
| 6,812,174 B2 | 11/2004 | Jantzen et al. | |
| 6,897,173 B2 | 5/2005 | Bernard et al. | |
| 6,933,045 B2 | 8/2005 | Tamura | |
| 7,160,824 B2 | 1/2007 | Zguris et al. | |
| 7,309,671 B2 | 12/2007 | Kurachi et al. | |
| 7,449,419 B2 | 11/2008 | Li | |
| 7,709,027 B2 | 5/2010 | Fechner et al. | |
| 7,795,163 B2 | 9/2010 | Wennemann et al. | |
| 8,828,897 B2 | 9/2014 | Fechner et al. | |
| 2005/0009428 A1* | 1/2005 | Porter et al. | 442/129 |
| 2005/0079970 A1 | 4/2005 | Otaki et al. | |
| 2006/0165968 A1* | 7/2006 | Tanaka et al. | 428/297.4 |
| 2007/0087139 A1 | 4/2007 | Creux et al. | |
| 2007/0220922 A1 | 9/2007 | Bauer et al. | |
| 2007/0225145 A1 | 9/2007 | Bauer et al. | |
| 2007/0243995 A1 | 10/2007 | Dallies et al. | |
| 2007/0251275 A1 | 11/2007 | Bauer et al. | |
| 2008/0139375 A1 | 6/2008 | Wennemann et al. | |
| 2008/0242527 A1 | 10/2008 | Otaki et al. | |
| 2009/0042030 A1 | 2/2009 | Douce et al. | |
| 2010/0184345 A1 | 7/2010 | Lalande et al. | |
| 2010/0248928 A1* | 9/2010 | Berthereau et al. | 501/32 |
| 2011/0028606 A1* | 2/2011 | Li et al. | 524/1 |
| 2012/0172190 A1* | 7/2012 | Li et al. | 501/35 |
| 2013/0059716 A1 | 3/2013 | Fechner et al. | |

FOREIGN PATENT DOCUMENTS

| | | |
|---|---|---|
| DE | 293105 A5 | 8/1991 |
| DE | 40 32 460 A1 | 6/1992 |
| EP | 0 708 743 B1 | 9/1998 |
| GB | 1548776 | 7/1979 |
| GB | 2 220 654 | 1/1990 |
| JP | 49017813 | 2/1974 |
| JP | H 11-29344 | 2/1999 |
| JP | H 11-180727 | 7/1999 |
| JP | 2000-203874 | 7/2000 |
| JP | 2001-26701 | 1/2001 |
| JP | 2004-43295 | 2/2004 |
| JP | 2005-324992 | 11/2005 |
| JP | 2009-513474 | 4/2009 |
| RU | 268740 | 7/1970 |
| RU | 312718 | 10/1971 |
| RU | 409981 | 5/1974 |
| SU | 418456 | 9/1974 |
| WO | WO 98/49111 | 11/1998 |
| WO | WO 01/46078 A2 | 6/2001 |
| WO | WO 03/018499 A2 | 3/2003 |
| WO | WO 2004/110944 | 12/2004 |
| WO | WO 2006/090030 | 8/2006 |
| WO | WO 2006/103377 | 10/2006 |
| WO | WO 2006/113379 | 10/2006 |
| WO | WO 2007/050529 | 5/2007 |
| WO | WO 2008/142347 | 11/2008 |
| WO | WO 2009/056768 A2 | 5/2009 |
| WO | WO 2011/035889 | 3/2011 |
| WO | WO 2011/017343 | 1/2012 |
| WO | WO 2012/001448 | 1/2012 |
| WO | WO 2012/001449 | 1/2012 |
| WO | WO 2013/116596 | 8/2013 |

OTHER PUBLICATIONS

United States Patent and Trademark Office, Amendment and Response to Office Action, U.S. Appl. No. 12/534,490, filed Aug. 27, 2014.

United States Patent and Trademark Office, Amendment and Response to Office Action, U.S. Appl. No. 12/534,490, filed Dec. 8, 2014.

United States Patent and Trademark Office, Office Action, U.S. Appl. No. 12/534,490 dated Sep. 9, 2014.

United States Patent and Trademark Office, Office Action, U.S. Appl. No. 12/534,490 dated May 30, 2014.

United States Patent and Trademark Office, Office Action, U.S. Appl. No. 13/365,590 mailed Jan. 10, 2014.

United States Patent and Trademark Office, Office Action, U.S. Appl. No. 13/365,590 mailed May 13, 2014.

United States Patent and Trademark Office, Office Action, U.S. Appl. No. 13/365,590 mailed Sep. 2, 2014.

United States Patent and Trademark Office, Office Action, U.S. Appl. No. 13/365,590 mailed Feb. 4, 2015.

United States Patent and Trademark Office, Office Action, U.S. Appl. No. 12/534,490 mailed Feb. 11, 2015.

United States Patent and Trademark Office, Office Action, U.S. Appl. No. 12/534,490 mailed Dec. 19, 2014.

United States Patent and Trademark Office, Office Action, U.S. Appl. No. 12/534,490 dated Jun. 3, 2015.

United States Patent and Trademark Office, Office Action, U.S. Appl. No. 13/365,590 dated May 20, 2015.

United States Patent and Trademark Office, Office Action, U.S. Appl. No. 13/365,590 dated Jul. 1, 2015.

United States Patent and Trademark Office, Amendment and Response to Office Action, U.S. Appl. No. 12/534,490, filed May 11, 2015.

United States Patent and Trademark Office, Request for Continued Examination, U.S. Appl. No. 13/365,590, filed Jun. 3, 2015.

United States Patent and Trademark Office, Amendment and Response to Final Office Action and Request for Consideration Under the After Final Consideration Pilot Program 2.0, U.S. Appl. No. 13/365,590, filed Apr. 30, 2015.

United States Patent and Trademark Office, Office Action, U.S. Appl. No. 12/534,490 dated Sep. 10, 2015.

United States Patent and Trademark Office, Request for Continued Examination, U.S. Appl. No. 12/534,490 dated Sep. 3, 2015.

United States Patent and Trademark Office, Request for Continued Examination, U.S. Appl. No. 12/534,490 dated Jan. 9, 2015.

United States Patent and Trademark Office, Office Action, U.S. Appl. No. 12/534,490 dated Jan. 12, 2016.

United States Patent and Trademark Office, Office Action, U.S. Appl. No. 13/365,590 dated Nov. 24, 2015.

State Intellectual Property Office of the Peoples Republic of China, First Office Action, Application No. 201380013694, dated Jan. 4, 2016.

United States Patent and Trademark Office, Office Action, U.S. Appl. No. 13/365,590 dated Mar. 29, 2016.

Balandina, T. et al., Study of the Possibility of Using Stripping Rocks for Manufacturing Ceramic Tiles (Abstract), Promyshlennost Stroitel'nykh materialov, Seriya 5: Keramicheskaya Promyshlennost, 8, 27-9 CODEN: PMSPDF, 1980.

Levitskii, I. et al., Colored Nonfritted Glazes from Available Raw Materials for Façade Ceramics (Abstract), Steklo I Keramika, 1-2, 20-4 CODEN: STKRAQ, ISSN: 0131-9582, 1995.

Loewenstein, K. et al., The Manufacturing Technology of Continuous Glass Fibres, Third, Completely Revised Edition, In Glass Science and Technology: 6, pp. 30-36, 1993.

Melkonyan, R., Perlite Rocks of Armenia as Valuable Raw Materials, Gornyi Zhurnal, 2, 40-43 CODEN: GOZHA6, ISSN: 0017-2278, 2003, with English language Abstract.

Roustambekyan, S. et al., Low Alkali Glass Fiber Produced from Pumice and Perlites, Promyshlennost Armenii, 9, 42-3 Coden: PAKBAG, ISSN: 0033-1163, 1972.

Simova, V. et al., New Composition of Glass-Fibers for Hydroinsulation Containing Manganese Oxide (Abstract), Stroitelni Materiali I Silikatna Promishlenost, 7(3), 27-9 CODEN: SMSIAO, ISSN: 0562-1836, 1966.

Wallenberger, F. et al., Glass Fibers, In ASM Handbook, vol. 21-Compositions (06781G), pp. 1-9, 2001.

Xiao, L. et al., Influence of Materials on Polymer Cement Concrete Fiber Composite Plate (Abstract), Jilin Jianzhu Gongcheng Xueyuan Xuebao, 23(2), 1-6, 11 CODEN: JJGXAP, ISSN: 1009-0185, 2006.

United States Patent and Trademark Office, Office Action, U.S. Appl. No. 12/534,490, mailed Feb. 23, 2011.

(56) References Cited

OTHER PUBLICATIONS

United States Patent and Trademark Office, Office Action, U.S. Appl. No. 12/534,490, mailed Aug. 17, 2011.

United States Patent and Trademark Office, Amendment and Response to Office Action, U.S. Appl. No. 12/534,490, filed May 23, 2011.

United States Patent and Trademark Office, Submission Accompanying Request for Continued Examination, U.S. Appl. No. 12/534,490, filed Jul. 5, 2012.

Database WPI, Week 1999154, Thomson Scientific, London, GB: AN 1999-175475, XP002663282, & JP 11 029344 A (Nippon Muki KK; Feb. 2, 1999) abstract.

Database WPI, Week 1999154, Thomson Scientific, London, GB: AN 1982-18554E, XP002663283, & JP 57 017444 A (Nippon Steel Chem Co.; Jan. 29, 1982) abstract.

Database WPI, Week 1999154, Thomson Scientific, London, GB: AN 2002-337430, XP002663284, & RU 2 180 317 C1 (Kornev, G V.; Mar. 10, 2002) abstract.

Patent Cooperation Treaty, International Search Report, International Application No. PCT/US2010/044275, mailed Nov. 28, 2011.

Patent Cooperation Treaty, International Preliminary Report on Patentability, International Application No. PCT/US2010/044275, mailed Feb. 16, 2012.

\* cited by examiner

Weibull Parameter Estimates same as Extreme-Value with a=exp(?), ß=1/d

| Parameter | Estimate | Lower 95% | Upper 95% | Number failed |
|---|---|---|---|---|
| a | 3125.9396 | 3087.6973 | 3163.0663 | 57 |
| ß | 23.10284 | 18.517975 | 28.270664 | 57 |

Summary

| Group | Number failed | Number censored | Mean | Std Error |
|---|---|---|---|---|
| Combined | 57 | 0 | 3050.74 | 22.3631 |

…

GLASS COMPOSITIONS AND FIBERS MADE THEREFROM

CROSS-REFERENCE TO RELATED APPLICATIONS

This application claims priority to U.S. Provisional Patent Application Ser. No. 61/594,426, filed on Feb. 3, 2012, and is also a continuation-in-part of U.S. application Ser. No. 13/365,590, filed Feb. 3, 2012, which is a continuation-in-part application of U.S. patent application Ser. No. 12/534,490, filed Aug. 3, 2009, each of which is hereby incorporated by reference as though fully set forth herein.

FIELD OF THE INVENTION

The present invention relates to glass compositions and, in particular, to glass compositions for forming fibers.

BACKGROUND OF THE INVENTION

Large scale commercial production of continuous glass fibers (E-glass and C-glass types) comprises melting batch materials consisting primarily of minerals that are crystalline or substantially crystalline in nature. Conversion of these crystalline raw materials to a glassy state requires significant energy to be applied during the melting process. In view of the significant energy investment accompanying crystalline materials, glassy or amorphous minerals have sometimes been used in the production of glass compositions. A glassy or amorphous structure can reduce the amount of energy consumed in the melting process. Glassy minerals such as basalt and obsidian, for example, have been used as significant portions of feedstock for the production of mineral wool.

An associated disadvantage with some glassy minerals, however, is the high iron content of such minerals. Basalt and obsidian both comprise relatively large amounts of iron, thereby making their resulting melts highly energy absorbing. As a result, use of conventional gas fired furnaces is typically impractical for melt processing of these minerals. Electrical melting can be used to process glassy minerals of high iron content, but this is often a constraint in high volume glass fiber production as compared with conventional gas fired furnace technology. Raw materials used in the production of E-glass and C-glass fibers are generally low in iron, thereby permitting the use of large scale gas fired furnaces.

Perlite (and its expanded form pumice) is a mineral that naturally occurs in the glassy form. Perlite has not been extensively used as a raw material in glass production, partially because of its compositional parameters. The major constituents of perlite are $SiO_2$, $Al_2O_3$ and alkali oxide ($R_2O$). $SiO_2$ is typically present in perlite in an amount between about 70 and about 75 weight percent. $Al_2O_3$ is typically present in perlite in an amount between about 12 and about 15 weight percent. Alkali oxides are typically present in perlite in an amount between about 3 and about 9 weight percent. These parameters conflict with the compositional requirements of several widely used glass compositions, including, for example, those of E-glass and C-glass.

E-glass compositions, for example, are well-suited for forming glass fibers. As a result, the majority of glass fibers used in reinforcement applications, such as polymeric reinforcement applications, are formed from E-glass compositions. E-glass compositions generally limit the amount alkali oxides to no more than 2 percent. The high alkali oxide content of perlite is inconsistent with this limitation and renders perlite largely unsuitable for use in batch compositions for the production of E-glass compositions.

Moreover, C-glass compositions have also been used to form fibers resistant to corrosion in acidic environments. In order to resist acidic corrosion, C-glass compositions comprise a high $SiO_2$ content and a low $Al_2O_3$ content (<8 wt. %). The high $Al_2O_3$ content of perlite generally precludes use of perlite in batch compositions for the production of C-glass compositions.

SUMMARY

In one aspect, the present invention provides glass compositions formed from batch compositions comprising significant amounts of one or more glassy minerals, including perlite and/or pumice. In another aspect, the present invention provides glass fibers formed from glass compositions described herein.

In some embodiments, the present invention provides a glass composition formed from a batch composition comprising at least 50 weight percent of a glassy mineral and at least 5 weight percent of a sodium source, wherein the glassy mineral comprises a combination of $SiO_2$ and $Al_2O_3$ in an amount of at least 80 weight percent. In some embodiments, the batch composition comprises at least 65 weight percent of a glassy mineral, the glassy mineral comprising a combination of $SiO_2$ and $Al_2O_3$ in an amount of at least 80 weight percent. In some embodiments, the glassy mineral comprising a combination of $SiO_2$ and $Al_2O_3$ is perlite, pumice or mixtures thereof.

In other embodiments, the present invention provides a glass composition formed from a batch composition comprising at least 10 weight percent of a glassy mineral, and at least 5 weight percent of a sodium source, wherein the glassy mineral comprises a combination of $SiO_2$ and $Al_2O_3$ in an amount of at least 80 weight percent. In some embodiments, the batch composition comprises at least 25 weight percent of a glassy mineral, the glassy mineral comprising a combination of $SiO_2$ and $Al_2O_3$ in an amount of at least 80 weight percent. In some further embodiments, the batch composition comprises at least 40 weight percent of a glassy mineral, the glassy mineral comprising a combination of $SiO_2$ and $Al_2O_3$ in an amount of at least 80 weight percent. In some embodiments, the glassy mineral comprising a combination of $SiO_2$ and $Al_2O_3$ is perlite, pumice or mixtures thereof.

Moreover, in some embodiments, the batch comprises at least 10 weight percent of a sodium source. A sodium source, in some embodiments, comprises sodium carbonate (soda).

In some embodiments, such as, for example, those where lower amounts of a glassy mineral are used, the batch can comprise an additional source or sources of silicon and/or aluminum. In some such embodiments, the batch can comprise at least 10 weight percent of a source of both silicon and aluminum. In some such embodiments, the source of both silicon and aluminum is an aluminum-containing silicate mineral, such kaolinite, dickite, halloysite, nacrite, montmorillonite, or alkali metal aluminosilicates. In some embodiments, the batch comprises at least 10 weight percent of a source of silicon. In some embodiments, the batch comprises at least 10 weight percent of a source of aluminum.

In another embodiment, the present invention provides a glass composition comprising 53-64 weight percent $SiO_2$, 8-12 weight percent $Al_2O_3$, 8.5-18 weight percent alkali oxide ($R_2O$) component and a metal oxide (RO) component, wherein the metal oxide component is present in an amount to provide a mass ratio of $R_2O/RO$ ranging from about 0.15 to about 1.5. In some such embodiments, the glass composition includes 10-12 weight percent $Al_2O_3$.

In another embodiment, the present invention provides a glass composition comprising 53-64 weight percent $SiO_2$, 8-12 weight percent $Al_2O_3$, 8.5-18 weight percent alkali oxide ($R_2O$) component and a metal oxide (RO) component, wherein the metal oxide component is present in an amount to provide a mass ratio of $R_2O/RO$ ranging from about 0.15 to about 1.7. In some such embodiments, the glass composition includes 10-12 weight percent $Al_2O_3$.

In some embodiments, a $R_2O$ component comprises $Na_2O$, $K_2O$ or $Li_2O$ or mixtures thereof. In some embodiments, a glass composition of the present invention comprises $Na_2O$ in an amount ranging from 6.5 weight percent to about 16 weight percent. A glass composition, in some embodiments, comprises $K_2O$ in an amount ranging from 0.5 weight percent to 5 weight percent, from 0.5 weight percent to 4 weigh percent in some embodiments, and from 2 weight percent to 4 weight percent in further embodiments. In some embodiments, a glass composition comprises $Li_2O$ in an amount up to 2 weight percent.

In some embodiments, a RO component comprises MgO, CaO, SrO, BaO, or ZnO or mixtures thereof. A RO component, in some embodiments, is present in a glass composition of the present invention in an amount ranging from 7 weight percent to 31 weight percent. In one embodiment, a glass composition comprises MgO in an amount up to about 5 weight percent. A glass composition, in some embodiments, comprises CaO in an amount ranging from 7 weight percent to 26 weight percent. In some embodiments, a glass composition comprises ZnO in an amount up to 3 weight percent.

Glass compositions of the present invention, in some embodiments, comprise metal oxides in addition to RO including, but not limited to, $ZrO_2$, $TiO_2$, $MnO_2$ or $La_2O_3$ or mixtures thereof.

In another embodiment, the present invention provides a glass composition comprising 56-63 weight percent $SiO_2$, 9-12 weight percent $Al_2O_3$, 12-17 weight percent RO (CaO+MgO), 12-14 weight percent $R_2O$ ($Na_2O+K_2O$), 0-2 weight percent $Li_2O$, 0-3 weight percent ZnO, 0-3 weight percent $ZrO_2$, 0-3 weight percent $MnO_2$ and 0-3 weight percent $La_2O_3$.

In another embodiment, the present invention provides a glass composition comprising 60-64 weight percent $SiO_2$, 9-12 weight percent $Al_2O_3$, 7-15 weight percent RO (CaO+MgO), 13-15.5 weight percent $R_2O$ ($Na_2O+K_2O$), 0-2 weight percent $Li_2O$, 0-3 weight percent ZnO, 0-3 weight percent $ZrO_2$, 0-3 weight percent $MnO_2$ and 0-3 weight percent $La_2O_3$.

In another embodiment, the present invention provides a glass composition comprising 55-63 weight percent $SiO_2$, 9-14 weight percent $Al_2O_3$, 11-16.5 weight percent RO (CaO+MgO), 14-17 weight percent $R_2O$ ($Na_2O+K_2O$), 0-2 weight percent $Li_2O$, 0-3 weight percent ZnO, 0-3 weight percent $ZrO_2$, 0-3 weight percent $MnO_2$ and 0-3 weight percent $La_2O_3$.

In some embodiments, glass compositions of the present invention have an $Fe_2O_3$ content of less than 1 weight percent. Glass compositions, in other embodiments, can comprise less than 0.7 weight percent $Fe_2O_3$.

Glass compositions, according to some embodiments of the present invention are fiberizable. In some embodiments, glass compositions of the present invention have a forming temperature ($T_F$) ranging from 1120° C. to about 1300° C.

As used herein, the term "forming temperature" means the temperature at which the glass composition has a viscosity of 1000 poise (or "log 3 temperature"). In some embodiments, glass compositions of the present invention are fiberizable at the forming temperature.

Moreover, in some embodiments, glass compositions of the present invention have a liquidus temperature ($T_L$) ranging from about 1020° C. to about 1240° C. In some embodiments, the difference between the forming temperature and the liquidus temperature of a glass composition of the present invention ranges from about 45° C. to about 165° C. In some embodiments, the difference between the forming temperature and the liquidus temperature of a glass composition of the present invention is at least 65° C.

In some embodiments, glass compositions of the present invention have a molten density at the forming temperature ranging from 2.35 g/cm$^3$ to 2.40 g/cm$^3$. In some embodiments, glass composition of the present invention have molten density ranging from 2.36 g/cm$^3$ to 2.38 g/cm$^3$.

Glass compositions of the present invention, in some embodiments, have a molten surface tension at the forming temperature ranging from about 390×10$^{-3}$ N/m to 400×10$^{-3}$ N/m.

As provided herein, glass fibers can be formed from some embodiments of the glass compositions of the present invention. In some embodiments, fibers formed from glass compositions of the present invention have a modulus (E) ranging from about 53 GPa to about 65 GPa. Moreover, in some embodiments, fibers formed from glass compositions of the present invention have a specific strength ranging from 1.30-1.35×10$^5$ m.

Fibers formed from glass compositions of the present invention, in some embodiments, also demonstrate acidic and alkaline corrosion resistance. In one embodiment, for example, a fiber formed from a glass composition of the present invention has a weight loss (wt. %) ranging from about 0.55 to about 0.60 when exposed to 1N $H_2SO_4$ (pH 0) at 100° C. for one hour. In another embodiment, a fiber formed from a glass composition of the present invention has a weight loss (wt. %) ranging from about 0.25 to 0.30 when exposed to 0.1N NaOH (pH 12) at 100° C. for one hour.

In some embodiments, glass fibers of the present invention can be continuous. A plurality of glass fibers can be gathered as a strand in some embodiments. In some embodiments, a plurality of glass fibers or a plurality of fiber glass strands can be combined into a roving. Some embodiments of the present invention relate to yarn formed from a plurality of glass fibers. While fibers or a plurality of fibers may be referred to as continuous, persons of ordinary skill in the art will appreciate that glass fibers (and likewise, fiber glass strands or rovings) that are referred to as continuous do not have an infinite length as, for example, breaks in production occur, glass fibers are wound into packages, etc.

Some embodiments of the present invention related to chopped glass fibers formed from glass compositions of the present invention. As set forth below, glass fibers of the present invention can be chopped to a variety of lengths depending on a number of factors including, for example, the desired use of the glass fibers. In some embodiments, glass fibers of the present invention can have a length of less than about 105 millimeters. Glass fibers, in some embodiments, can have a length of less than about 13 millimeters. Glass fibers, in some embodiments, can be chopped and have a length greater than about 3 millimeters. In some embodiments, glass fibers can be chopped and have a length greater than about 50 millimeters. In some embodiments, the plurality of chopped glass fibers can be wet chopped glass fibers such that a sizing composition (or other coating composition) has not dried entirely on the surfaces of the glass fibers.

Some embodiments of the present invention relate to fabrics comprising a plurality of glass fibers formed from glass compositions of the present invention. Such fabrics can be woven fabrics in some embodiments, and non-woven fabrics in other embodiments.

Glass fibers formed from glass compositions of the present invention can be used in various reinforcement applications. In some embodiments, glass fibers of the present invention are used in the reinforcement of polymers including thermoplastics and thermosets. In some embodiments, glass fibers formed from glass compositions of the present invention are used in the reinforcement of building materials including, but not limited to, cement and roofing systems and such as shingles. Other uses are disclosed herein.

Some embodiments of the present invention relate to a polymeric composite comprising a polymeric material and a plurality of glass fibers in the polymeric material, the plurality of glass fibers being formed from a glass composition of the present invention. The polymeric material can be a thermoplastic polymer in some embodiments, and a thermosetting polymer in other embodiments. The at least one glass fiber can be chopped as set forth above and have a variety of lengths depending, for example, on the particular polymeric composite. For example, the plurality of glass fibers can have a length of less than about 105 millimeters in some embodiments, and less than about 13 millimeters in other embodiments. The plurality of glass fibers can have a length of greater than about 50 microns in some embodiments, greater than about 3 millimeters in other embodiments, and greater than about 50 millimeters in other embodiments. In some embodiments, the plurality of glass fibers can be in the form of a woven fabric and/or a non-woven fabric.

In another aspect, the present invention provides methods of making glass compositions from batch compositions comprising significant amounts of one or more glassy minerals, including perlite and/or pumice.

In one embodiment, a method of making a glass composition of the present invention comprises providing a batch composition comprising at least 10 weight percent of a glassy mineral and at least 5 weight percent of a sodium source, the glassy mineral comprising a combination of $SiO_2$ and $Al_2O_3$ in an amount of at least 80 weight percent and heating the batch composition to a temperature sufficient to form the glass composition. In some embodiments, the batch comprises at least 10 weight percent of an additional source of both silicon and aluminum. In some embodiments, the batch comprises at least 10 weight percent of an additional source of silicon. In some embodiments, the batch comprises at least 10 weight percent of an additional source of aluminum. In some embodiments, the amount of glassy mineral in the batch composition is at least 50 weight percent. In some embodiments, the batch composition is heated to a temperature of about 1400° C. to about 1450° C.

These and other embodiments are presented in greater detail in the detailed description which follows.

DETAILED DESCRIPTION

Figure 1:
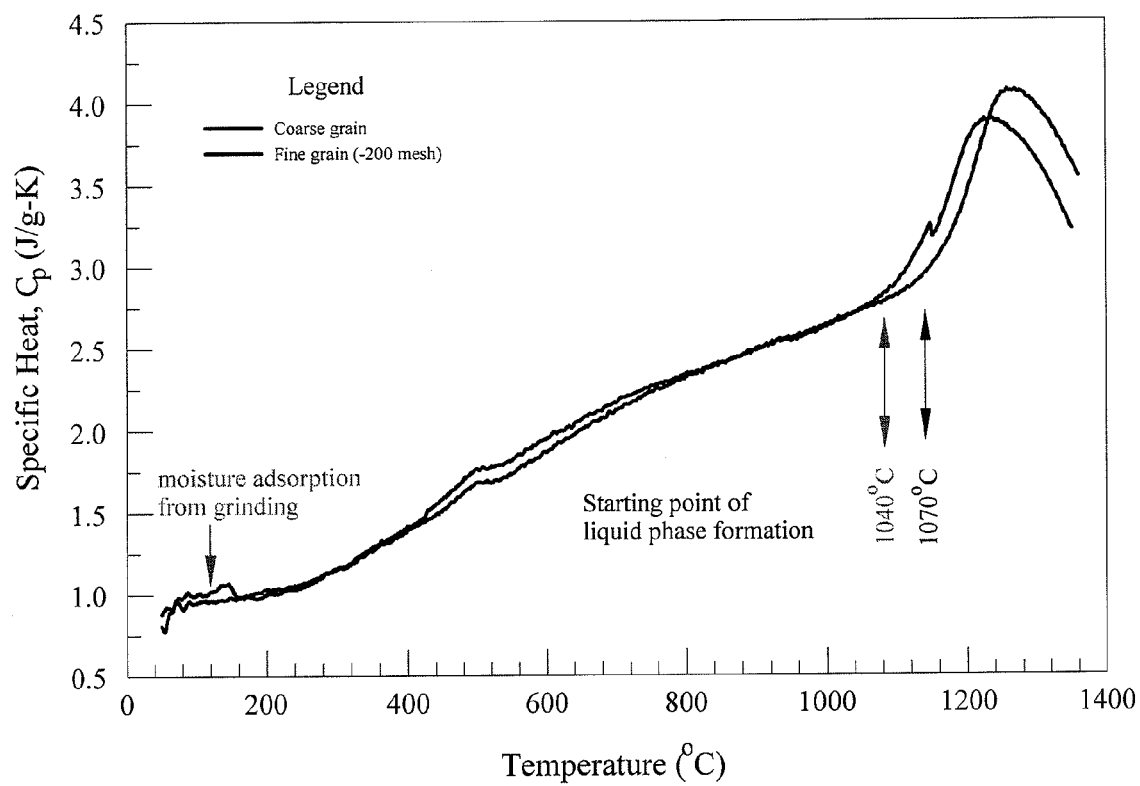
FIG. 1 provides the results of a high temperature differential thermal analysis (DTA) comparing conversion from solid to liquid of fine particulate perlite and a coarse particulate perlite according to one embodiment of the present invention.

Unless indicated to the contrary, the numerical parameters set forth in the following specification are approximations that can vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more, e.g. 1 to 6.1, and ending with a maximum value of 10 or less, e.g., 5.5 to 10. Additionally, any reference referred to as being "incorporated herein" is to be understood as being incorporated in its entirety.

It is further noted that, as used in this specification, the singular forms "a," "an," and "the" include plural referents unless expressly and unequivocally limited to one referent.

Certain embodiments of the present invention can employ the various thermodynamic and processing advantages offered by glassy minerals to provide glass compositions having desirable properties. In one aspect, the present invention provides glass compositions formed from batch compositions comprising significant amounts of one or more glassy minerals, including perlite and/or pumice. The glass compositions, in some embodiments, can be fiberizable glass compositions. In some embodiments, glass fibers formed from glass compositions of the present invention can demonstrate advantageous properties including, but not limited to, mechanical and corrosion resistant properties equaling or exceeding glass fibers formed from previous compositions, such as E-glass and C-glass compositions.

Various embodiments of the present invention provide glass compositions, including, without limitation, fiberizable glass compositions. In some embodiments, the present invention provides a glass composition formed from a batch composition comprising at least 10 weight percent of a glassy mineral, and at least 5 weight percent of a sodium source, wherein the glassy mineral comprises a combination of $SiO_2$ and $Al_2O_3$ in an amount of at least 80 weight percent. In some embodiments, the batch composition comprises at least 25 weight percent of a glassy mineral, the glassy mineral comprising a combination of $SiO_2$ and $Al_2O_3$ in an amount of at least 80 weight percent. In some further embodiments, the batch composition comprises at least 40 weight percent of a glassy mineral, the glassy mineral comprising a combination of $SiO_2$ and $Al_2O_3$ in an amount of at least 80 weight percent.

In some embodiments, the present invention provides a glass composition formed from a batch composition comprising at least 50 weight percent of a glassy mineral and at least 5 weight percent of a sodium source, wherein the glassy mineral comprises a combination of $SiO_2$ and $Al_2O_3$ in an amount of at least 80 weight percent. In some embodiments, the batch composition comprises at least 65 weight percent of a glassy mineral, the glassy mineral comprising a combination of $SiO_2$ and $Al_2O_3$ in an amount of at least 80 weight percent. In another embodiment, the batch composition comprises at least 68 weight percent of a glassy mineral, the glassy mineral comprising a combination of $SiO_2$ and $Al_2O_3$ in an amount of at least 80 weight percent.

In some embodiments, the glassy mineral comprising a combination of $SiO_2$ and $Al_2O_3$ is perlite, pumice or mixtures thereof.

Moreover, in some embodiments, the batch composition comprises at least 10 weight percent of a sodium source. In another embodiment, the batch composition comprises at least 12 weight percent of a sodium source. A suitable sodium source for use in batch compositions of the present invention, in some embodiments, comprises sodium carbonate (soda).

In some embodiments, such as, for example, those where lower amounts of a glassy mineral are used, the batch can comprise an additional source or sources of silicon and/or aluminum. In some such embodiments, the batch can comprise at least 10 weight percent of an additional source of both silicon and aluminum. In some such embodiments, the additional source of both silicon and aluminum is an aluminum-containing silicate mineral, such kaolinite, dickite, halloysite, nacrite, montmorillonite, or alkali metal aluminosilicates. In some embodiments, the batch comprises at least 10 weight percent of a source of silicon. In some such embodiments, the source of silicon can be a silicon-containing mineral, such as silica. In some embodiments, the batch comprises at least 10 weight percent of a source of aluminum. In some such embodiments, the source of aluminum can be an aluminum-containing mineral, such as corundum.

In another embodiment, the present invention provides a glass composition comprising 53-64 weight percent $SiO_2$, 8-12 weight percent $Al_2O_3$, 8.5-18 weight percent alkali oxide ($R_2O$) component and a metal oxide (RO) component, wherein the metal oxide component is present in an amount to provide a mass ratio of $R_2O/RO$ ranging from about 0.15 to about 1.5.

In some embodiments, a $R_2O$ component is not limited to a single compound but can comprise several compounds. In some embodiments, a $R_2O$ component comprises $Na_2O$, $K_2O$ or $Li_2O$ or mixtures thereof. Moreover, in some embodiments and without limitation, a $R_2O$ component can mean $Na_2O$ only, $K_2O$ only, $Li_2O$ only, a combination of $Na_2O$ and $K_2O$, a combination of $K_2O$ and $Li_2O$, a combination of $Na_2O$ and $Li_2O$, or a combination of $Na_2O$, $K_2O$ and $Li_2O$.

In some embodiments, a glass composition of the present invention comprises $Na_2O$ in an amount ranging from 6.5 weight percent to about 16 weight percent. A glass composition, in some embodiments, comprises $Na_2O$ in an amount ranging from 9 weight percent to 14 weight percent. In another embodiment, a glass composition comprises $Na_2O$ in an amount ranging from 9 weight percent to 13 weight percent. In some embodiments, a glass composition comprises $Na_2O$ in an amount ranging from 10 weight percent to 12.5 weight percent.

In some embodiments, a glass composition of the present invention comprises K2O in an amount ranging from 0.5 weight percent to 5 weight percent. A glass composition of the present invention, in some embodiments, comprises $K_2O$ in an amount ranging from 0.5 weight percent to 4 weight percent. A glass composition of the present invention, in some embodiments, comprises $K_2O$ in an amount ranging from 2 weight percent to 4 weight percent. In some embodiments, a glass composition comprises $K_2O$ in an amount ranging from 2.5 weight percent to 3.5 weight percent.

In some embodiments, a glass composition of the present invention comprises $Li_2O$ in an amount up to 2 weight percent. A glass composition, in another embodiment, comprises $Li_2O$ in an amount ranging from 0.5 weight percent to 1.5 weight percent.

In some embodiments, a RO component comprises MgO, CaO, SrO, BaO or ZnO or mixtures thereof. In some embodiments, a RO component can comprise MgO only, CaO only, SrO only, BaO only or ZnO only. In some embodiments, a RO component can comprise any combination of two or more metal oxides of MgO, CaO, SrO, BaO and ZnO. A RO component, in some embodiments, is present in a glass composition of the present invention in an amount ranging from 7 weight percent to 31 weight percent.

In one embodiment, a glass composition of the present invention comprises MgO in an amount up to 5 weight percent. A glass composition, in another embodiment, comprises MgO in an amount ranging from 1 weight percent to 4 weight percent. In some embodiments, a glass composition comprises MgO in an amount ranging from 2 weight percent to 3 weight percent. In some embodiments, a glass composition comprises MgO in an amount <1 weight percent. A glass composition, in some embodiments, comprises MgO in an amount <0.5 weight percent In some embodiments, a glass composition of the present invention comprises CaO in an amount ranging from 7 weight percent to 26 weight percent. A glass composition, in another embodiment, comprises CaO in an amount ranging from 8 weight percent to 20 weight percent. In some embodiments, a glass composition comprises CaO in an amount ranging from 8 weight percent to 14 weight percent. A glass composition, in another embodiment, comprises CaO in an amount ranging from 10 weight percent to 14 weight percent. In some compositions, a glass composition comprises CaO in an amount ranging from 9 weight percent to 11 weight percent.

In some embodiments, a glass composition comprises ZnO in an amount up to 3 weight percent.

Glass compositions of the present invention, in some embodiments, comprise metal oxides in addition to RO including, but not limited to $ZrO_2$, $TiO_2$, $MnO_2$ or $La_2O_3$ or mixtures thereof. In some embodiments, a glass composition can comprise $ZrO_2$ in an amount up to 3 weight percent, $TiO_2$ in an amount up to 3 weight percent, $MnO_2$ in an amount up to 3 weight percent and/or $La_2O_3$ in an amount up to 3 weight percent. In some embodiments, a glass composition can comprise $TiO_2$ in an amount up to 1 weight percent.

In another embodiment, the present invention provides a glass composition comprising 53-64 weight percent $SiO_2$, 8-12 weight percent $Al_2O_3$, 8.5-18 weight percent alkali oxide ($R_2O$) component and a metal oxide (RO) component, wherein the metal oxide component is present in an amount to provide a mass ratio of $R_2O/RO$ ranging from about 0.15 to about 1.7.

In another embodiment, the present invention provides a glass composition comprising 56-63 weight percent $SiO_2$, 9-12 weight percent $Al_2O_3$, 12-17 weight percent RO (CaO+ MgO), 12-14 weight percent $R_2O$ ($Na_2O+K_2O$), 0-2 weight percent $Li_2O$, 0-3 weight percent ZnO, 0-3 weight percent $ZrO_2$, 0-3 weight percent $MnO_2$ and 0-3 weight percent $La_2O_3$.

In another embodiment, the present invention provides a glass composition comprising 60-64 weight percent $SiO_2$, 9-12 weight percent $Al_2O_3$, 7-15 weight percent RO (CaO+ MgO), 13-15.5 weight percent $R_2O$ ($Na_2O+K_2O$), 0-2 weight percent $Li_2O$, 0-3 weight percent ZnO, 0-3 weight percent $ZrO_2$, 0-3 weight percent $MnO_2$ and 0-3 weight percent $La_2O_3$.

In another embodiment, the present invention provides a glass composition comprising 55-63 weight percent $SiO_2$, 9-14 weight percent $Al_2O_3$, 11-16.5 weight percent RO (CaO+MgO), 14-17 weight percent $R_2O$ ($Na_2O+K_2O$), 0-2 weight percent $Li_2O$, 0-3 weight percent ZnO, 0-3 weight percent $ZrO_2$, 0-3 weight percent $MnO_2$ and 0-3 weight percent $La_2O_3$.

In some embodiments, glass compositions of the present invention have an $Fe_2O_3$ content of less than 1 weight percent. Glass compositions, in other embodiments, can comprise less than 0.7 weight percent $Fe_2O_3$.

Glass compositions of the present invention, in some embodiments, have a forming temperature ($T_F$) ranging from about 1120° C. to about 1300° C. In another embodiment, glass compositions of the present invention have a forming temperature ranging from about 1150° C. to about 1250° C. In some embodiments, glass compositions have a forming temperature ranging from about 1200° C. to about 1240° C.

Glass compositions of the present invention, in some embodiments, have a liquidus temperature ranging from about 1020° C. to about 1240° C. In another embodiment, glass compositions of the present invention have a liquidus temperature ranging from about 1070° C. to about 1200° C. In some embodiments, glass compositions of the present invention have a liquidus temperature ranging from about 1110° C. to about 1150° C.

In some embodiments, the difference between the forming temperature and the liquidus temperature of a glass composition of the present invention ranges from about 45° C. to about 165° C. In some embodiments, the difference between the forming temperature and the liquidus temperature of a glass composition of the present invention is at least 65° C.

In some embodiments, glass compositions of the present invention have a molten density at the forming temperature ranging from 2.35 g/cm³ to 2.40 g/cm³. In some embodiments, glass compositions of the present invention have molten density ranging from 2.36 g/cm³ to 2.38 g/cm³. As discussed further herein, in some embodiments, molten densities of some glass compositions of the present invention are 5% to 7% lower than the molten densities of some E-glass compositions. As a result, glass fibers formed from some glass compositions of the present invention are lighter per unit volume in comparison to some E-glass fibers. Lighter glass fibers can be advantageous in many applications, particularly material reinforcement applications, such as polymeric reinforcement applications, where weight savings are often highly desirable. Moreover, as a result of lower densities, glass fibers formed from some glass compositions of the present invention can have larger diameters in comparison to some E-glass fibers of the same weight, thereby providing enhanced mechanical properties.

Additionally, glass compositions of the present invention, in some embodiments, have a molten surface tension at the forming temperature ranging from about 390×10⁻³ N/m to 400×10⁻³ N/m.

As provided herein, glass compositions of the present invention can be produced from batch compositions comprising a significant amount of one or more glassy minerals, including perlite and/or pumice. In being produced from batch compositions comprising a significant amount of glassy minerals, glass compositions of the present invention can realize sizable energy savings in some embodiments. As discussed further herein, in some embodiments, production of a melt of a glass composition of the present invention requires up to 33% less energy in comparison to that required to produce a melt of some E-glass compositions.

Glass compositions of the present invention can be produced by several methods. In one embodiment, a method of producing a glass composition comprises providing a batch composition comprising at least 50 weight percent of a glassy mineral and at least 5 weight percent of a sodium source, the glassy mineral comprising a combination of $SiO_2$ and $Al_2O_3$ in an amount of at least 80 weight percent and heating the batch composition to a temperature sufficient to form a melt of the glass composition. In other embodiments, a method of producing a glass composition comprises providing a batch composition comprising at least 10 weight percent of a glassy mineral and at least 5 weight percent of a sodium source, the glassy mineral comprising a combination of $SiO_2$ and $Al_2O_3$ in an amount of at least 80 weight percent and heating the batch composition to a temperature sufficient to form a melt of the glass composition. In some embodiments, the batch composition is heated to a temperature of about 1400° C. to about 1450° C. In some embodiments, such as, for example, those where lower amounts of a glassy mineral are used, the batch can comprise at least 10 weight percent of an additional source of both silicon and aluminum. In some such embodiments, the source of both silicon and aluminum is an aluminum-containing silicate mineral, such kaolinite, dickite, halloysite, nacrite, montmorillonite, or alkali metal aluminosilicates. In some embodiments, the batch can comprise at least 10 weight percent of an additional source of silicon. In some embodiments, the batch can comprise at least 10 weight percent of an additional source of aluminum In some embodiments, the batch composition comprises at least 65 weight percent of a glassy mineral, the glassy mineral comprising a combination of $SiO_2$ and $Al_2O_3$ in an amount of at least 80 weight percent. In another embodiment, the batch composition comprises at least 68 weight percent of a glassy mineral, the glassy mineral comprising a combination of $SiO_2$ and $Al_2O_3$ in an amount of at least 80 weight percent. In some embodiments, the batch composition comprises at least 25 weight percent of a glassy mineral, the glassy mineral comprising a combination of $SiO_2$ and Al2O3 in an amount of at least 80 weight percent. In another embodiment, the batch composition comprises at least 40 weight percent of a glassy mineral, the glassy mineral comprising a combination of $SiO_2$ and Al2O3 in an amount of at least 80 weight percent.

In some embodiments, a glassy mineral comprising a combination of $SiO_2$ and $Al_2O_3$ in an amount of at least 80 weight percent is perlite, pumice or mixtures thereof. Perlite and/or pumice used in the production of glass compositions of the present invention, in some embodiments, is provided in particulate or powder form. In some embodiments, additional energy savings can be realized by using perlite and/or pumice compositions having fine particle sizes as opposed to coarser particle sizes. FIG. 1 illustrates the results of a high temperature differential thermal analysis (DTA) comparing the conversion from solid to liquid of a fine particulate perlite (about 200 mesh) and a coarse particulate perlite (about 45 mesh). As illustrated in FIG. 1, the fine particulate perlite requires less energy during conversion from solid to liquid in comparison to the coarse particulate perlite, although both the fine and the coarse particulate perlite are glassy or amorphous at room temperature. Moreover, the fine particulate perlite begins liquid formation at a lower temperature than the coarse particulate perlite.

Moreover, in some embodiments, batch compositions of the present invention comprise at least 10 weight percent of a sodium source. In some embodiments, batch compositions comprise at least 12 weight percent of a sodium source. A suitable sodium source for use in batch compositions of the present invention, in some embodiments, comprises sodium carbonate (soda).

In some embodiments, batch compositions used to produce glass compositions of the present invention further comprise other minerals including, but not limited to, limestone, dolomite or mixtures thereof. In one embodiment, for example, a batch composition further comprises up to 17 weight percent limestone. In another embodiment, a batch composition further comprises up to 13 weight percent dolomite.

As provided herein, glass fibers can be formed from any of the glass compositions of the present invention. Glass fibers according to the various embodiments of the present invention can be formed using any process known in the art for forming glass fibers, and more desirably, any process known in the art for forming essentially continuous glass fibers. For example, although not limiting herein, the glass fibers according to non-limiting embodiments of the present invention can be formed using direct-melt or indirect-melt fiber forming methods. These methods are well known in the art and further discussion thereof is not believed to be necessary in view of the present disclosure. See, e.g., K. L. Loewenstein, *The Manufacturing Technology of Continuous Glass Fibers*, $3^{rd}$ Ed., Elsevier, N.Y., 1993 at pages 47-48 and 117-234.

In one embodiment, the present invention provides a glass fiber comprising a glass composition formed from a batch composition comprising at least 50 weight percent of a glassy mineral and at least 5 weight percent of a sodium source, wherein the glassy mineral comprises a combination of $SiO_2$ and $Al_2O_3$ in an amount of at least 80 weight percent. In some embodiments, the batch composition comprises at least 65 weight percent of a glassy mineral, the glassy mineral comprising a combination of $SiO_2$ and $Al_2O_3$ in an amount of at least 80 weight percent. In another embodiment, the batch composition comprises at least 68 weight percent of a glassy mineral, the glassy mineral comprising a combination of $SiO_2$ and $Al_2O_3$ in an amount of at least 80 weight percent.

In another embodiment, the present invention provides a glass fiber comprising a glass composition formed from a batch composition comprising at least 10 weight percent of a glassy mineral and at least 5 weight percent of a sodium source, wherein the glassy mineral comprises a combination of $SiO_2$ and $Al_2O_3$ in an amount of at least 80 weight percent. In some embodiments, the batch composition comprises at least 25 weight percent of a glassy mineral, the glassy mineral comprising a combination of $SiO_2$ and $Al_2O_3$ in an amount of at least 80 weight percent. In another embodiment, the batch composition comprises at least 48 weight percent of a glassy mineral, the glassy mineral comprising a combination of $SiO_2$ and $Al_2O_3$ in an amount of at least 80 weight percent. In some further embodiments, such as, for example, those where lower amounts of a glassy mineral are used, the batch composition comprises at least 10 weight percent of an additional source of both silicon and aluminum. In some embodiments, the batch comprises at least 10 weight percent of an additional source of silicon. In some embodiments, the batch comprises at least 10 weight percent of an additional source of aluminum.

In another embodiment, the present invention provides a glass fiber comprising 53-64 weight percent $SiO_2$, 8-12 weight percent $Al_2O_3$, 8.5-18 weight percent alkali oxide ($R_2O$) component and a metal oxide (RO) component, wherein the metal oxide component is present in an amount to provide a mass ratio of $R_2O$/RO ranging from about 0.15 to about 1.5. In some such embodiments, the glass composition includes 10-12 weight percent $Al_2O_3$.

In another embodiment, the present invention provides a glass fiber comprising 53-64 weight percent $SiO_2$, 8-12 weight percent $Al_2O_3$, 8.5-18 weight percent alkali oxide ($R_2O$) component and a metal oxide (RO) component, wherein the metal oxide component is present in an amount to provide a mass ratio of $R_2O$/RO ranging from about 0.15 to about 1.7. In some such embodiments, the glass composition includes 10-12 weight percent $Al_2O_3$.

In another embodiment, the present invention provides a glass fiber comprising 56-63 weight percent $SiO_2$, 9-12 weight percent $Al_2O_3$, 12-17 weight percent RO (CaO+MgO), 12-14 weight percent $R_2O$ ($Na_2O+K_2O$), 0-2 weight percent $Li_2O$, 0-3 weight percent ZnO, 0-3 weight percent $ZrO_2$, 0-3 weight percent $MnO_2$ and 0-3 weight percent $La_2O_3$.

In another embodiment, the present invention provides a glass fiber comprising 60-64 weight percent $SiO_2$, 9-12 weight percent $Al_2O_3$, 7-15 weight percent RO (CaO+MgO), 13-15.5 weight percent $R_2O$ ($Na_2O+K_2O$)), 0-2 weight percent $Li_2O$, 0-3 weight percent ZnO, 0-3 weight percent $ZrO_2$, 0-3 weight percent $MnO_2$ and 0-3 weight percent $La_2O_3$.

In another embodiment, the present invention provides a glass fiber comprising 55-63 weight percent $SiO_2$, 9-14 weight percent $Al_2O_3$, 11-16.5 weight percent RO (CaO+MgO), 14-17 weight percent $R_2O$ ($Na_2O+K_2O$), 0-2 weight percent $Li_2O$, 0-3 weight percent ZnO, 0-3 weight percent $ZrO_2$, 0-3 weight percent $MnO_2$ and 0-3 weight percent $La_2O_3$.

In some embodiments, fibers formed from glass compositions of the present invention have a modulus (E) ranging from about 53.0 GPa to about 65.0 GPa. In another embodiment, fibers formed form glass compositions of the present invention have a modulus (E) ranging from about 56 GPa to about 62 GPa. Moreover, in some embodiments, fibers formed from glass compositions of the present invention have a specific strength ranging from $1.30-1.35 \times 10^5$ m.

Fibers formed from glass compositions of the present invention, in some embodiments, also demonstrate acidic and alkaline corrosion resistance. In one embodiment, for example, a glass fiber formed from a glass composition of the present invention has a weight loss (wt. %) ranging from 0.55 to 0.60 when exposed to 1N $H_2SO_4$ (pH 0) at 96° C. for one hour. In another embodiment, a glass fiber formed from a glass composition of the present invention has a weight loss (wt. %) ranging from 0.60 to 1.70 when exposed to 1N $H_2SO_4$ (pH 0) at 96° C. for one hour.

In another embodiment, a fiber formed from a glass composition of the present invention has a weight loss (wt. %) ranging from about 0.25 to about 0.30 when exposed to 0.1N NaOH (pH 12) at 96° C. for one hour. A fiber formed from a glass composition of the present invention, in some embodiments, has a weight loss (wt. %) ranging from 0.35 to 0.85 when exposed to 0.1N NaOH (pH 12) at 96° C. for one hour.

Although not limiting herein, glass fibers according to some embodiments of the present invention can be useful in structural reinforcement applications. In some embodiments, glass fibers of the present invention are used in the reinforcement of polymers including thermoplastics and thermosets. In some embodiments, glass fibers formed from glass compositions of the present invention can be used in the reinforcement of building materials including, but not limited to, cement and roofing systems such as shingles. Other uses and applications for various embodiments of glass fibers formed from glass compositions of the present invention are discussed below.

In one embodiment, the present invention provides a polymeric composite comprising a polymeric material and at least one glass fiber in the polymeric material, the at least one glass fiber comprising a glass composition formed from a batch composition comprising at least 50 weight percent of a glassy mineral and at least 5 weight percent of a sodium source, wherein the glassy mineral comprises a combination of $SiO_2$ and $Al_2O_3$ in an amount of at least 80 weight percent. In some embodiments, the batch composition comprises at least 65 weight percent of a glassy mineral, the glassy mineral comprising a combination of $SiO_2$ and $Al_2O_3$ in an amount of at least 80 weight percent. In another embodiment, the batch composition comprises at least 68 weight percent of a glassy mineral, the glassy mineral comprising a combination of $SiO_2$ and $Al_2O_3$ in an amount of at least 80 weight percent.

In another embodiment, the present invention provides a polymeric composite comprising a polymeric material and at least one glass fiber in the polymeric material, the at least one glass fiber comprising a glass composition a formed from a batch composition comprising at least 10 weight percent of a glassy mineral and at least 5 weight percent of a sodium source, wherein the glassy mineral comprises a combination of $SiO_2$ and $Al_2O_3$ in an amount of at least 80 weight percent. In some embodiments, the batch composition comprises at least 25 weight percent of a glassy mineral, the glassy mineral comprising a combination of $SiO_2$ and $Al_2O_3$ in an amount of at least 80 weight percent. In another embodiment, the batch composition comprises at least 40 weight percent of a glassy mineral, the glassy mineral comprising a combination of $SiO_2$ and $Al_2O_3$ in an amount of at least 80 weight percent.

In another embodiment, the present invention provides a polymeric composite comprising a polymeric material and at least one glass fiber in the polymeric material, the at least one glass fiber comprising 53-64 weight percent $SiO_2$, 8-12 weight percent $Al_2O_3$, 8.5-18 weight percent alkali oxide ($R_2O$) component and a metal oxide (RO) component, wherein the metal oxide component is present in an amount to provide a mass ratio of $R_2O/RO$ ranging from about 0.15 to about 1.5. In another embodiment, the present invention provides a polymeric composite comprising a polymeric material and at least one glass fiber in the polymeric material, the at least one glass fiber comprising 53-64 weight percent $SiO_2$, 8-12 weight percent $Al_2O_3$, 8.5-18 weight percent alkali oxide ($R_2O$) component and a metal oxide (RO) component, wherein the metal oxide component is present in an amount to provide a mass ratio of $R_2O/RO$ ranging from about 0.15 to about 1.7. In some such embodiments, the glass composition includes 10-12 weight percent $Al_2O_3$.

In another embodiment, the present invention provides a polymeric composite comprising a polymeric material and at least one glass fiber in the polymeric material, the at least one glass fiber comprising 56-63 weight percent $SiO_2$, 9-12 weight percent $Al_2O_3$, 12-17 weight percent RO (CaO+MgO), 12-14 weight percent $R_2O$ ($Na_2O+K_2O$), 0-2 weight percent $Li_2O$, 0-3 weight percent ZnO, 0-3 weight percent $ZrO_2$, 0-3 weight percent $MnO_2$ and 0-3 weight percent $La_2O_3$.

In another embodiment, the present invention provides a polymeric composite comprising a polymeric material and at least one glass fiber in the polymeric material, the at least one glass fiber comprising 60-64 weight percent $SiO_2$, 9-12 weight percent $Al_2O_3$, 7-15 weight percent RO (CaO+MgO), 13-15.5 weight percent $R_2O$ ($Na_2O+K_2O$)), 0-2 weight percent $Li_2O$, 0-3 weight percent ZnO, 0-3 weight percent $ZrO_2$, 0-3 weight percent $MnO_2$ and 0-3 weight percent $La_2O_3$.

In another embodiment, the present invention provides a polymeric composite comprising a polymeric material and at least one glass fiber in the polymeric material, the at least one glass fiber comprising 55-63 weight percent $SiO_2$, 9-14 weight percent $Al_2O_3$, 11-16.5 weight percent RO (CaO+ MgO), 14-17 weight percent $R_2O$ ($Na_2O+K_2O$), 0-2 weight percent $Li_2O$, 0-3 weight percent ZnO, 0-3 weight percent $ZrO_2$, 0-3 weight percent $MnO_2$ and 0-3 weight percent $La_2O_3$.

Polymeric composites according to the various embodiments of the present invention can be made by any method known in the art for making polymeric composites. For example, in one embodiment, polymeric composites according to the present invention can be made by impregnating woven fabrics or non-woven fabrics or mats of glass fibers with a polymeric material and then curing the polymeric material. In another embodiment, continuous glass fibers and/or chopped glass fibers comprising glass compositions of the present invention can be disposed in the polymeric material. Depending on the identity of the polymeric material, the polymeric material can be cured subsequent to receiving the continuous or chopped glass fibers.

Exemplary uses and applications for various embodiments of glass fibers formed from glass compositions of the present invention will now be discussed. The potential uses and applications, as well as the fiber glass properties, identified below are not intended to be exclusive, and persons of ordinary skill in the art can generally identify other uses and applications for such glass fibers, as well as variations in fiber diameter and tex (grams/kilometer) of the fiber glass products to be used in such applications.

Wet Chop Products

In some embodiments, glass fibers formed from glass compositions of the present invention can be provided as wet chop products for use in, for example, roofing and automotive applications. For example, glass fibers of the present invention can be provided as wet chop products having diameters and chop lengths suitable for various such applications. Non-limiting examples of various chopped fiber glass properties are provided in Table 1 below:

TABLE 1

| Product No. | Tex (g/km) (nominal) | Fiber Diameter (μm) (nominal) | Chop Length (inch) (nominal) |
|---|---|---|---|
| 1 | 1747 | 13 | 0.5 |
| 2 | 3352 | 19 | 0.75 |
| 3 | 2505 | 17 | 1.375 |
| 4 | 2505 | 17 | 1.75 |
| 5 | 1747 | 13 | 0.75 |
| 6 | 1747 | 13 | 0.75 |
| 7 | 2505 | 17 | 1.375 |
| 8 | 2505 | 17 | 1.25 |

In general, such products can have broad application as reinforcements. Product Nos. 1 and 2 might be used, for example and without limitation, in high end light weight polypropylene reinforcement applications such as automotive headliners and instrument panels. Product Nos. 3-5 might be used, for example and without limitation, in residential roofing shingle reinforcement and in some embodiments, can offer desirable tensile and tear strengths. Product No. 6 might be used, for example and without limitation, in high end commercial roofing shingle reinforcement and in some embodiments, can offer desirable tensile and tear strengths. Product Nos. 7 and 8 might be used, for example and without limitation, in high end residential roofing shingle reinforcement and in some embodiments, can offer desirable tensile and tear strengths.

Various sizing compositions known to those of skill in the art can be used on such fiber glass products depending on the type of product, compatibility with the resin system to be reinforced, the ultimate end product, downstream processing steps, and other factors. For example, in connection with roofing shingle reinforcement, sizing compositions can be selected that are compatible with acid white water papermaking systems. As another example, sizing compositions can be designed for compatibility with polypropylene reinforcement manufacturing.

Roving and Gun Roving Products

In some embodiments, glass fibers formed from glass compositions of the present invention can be provided as direct rovings or gun rovings. Direct rovings are understood to comprise a single bundle of continuous fibers combined into a discrete strand. Gun rovings can be formed from a plurality of direct wovings, for example, by assembling the direct rovings into a roving package. Direct rovings and gun rovings comprising such glass fibers, in some embodiments, may be used in applications where corrosion resistance is desirable. Non-limiting examples of such applications can include grating, deck panels, truck door panels, dunnagebars, sewage treatment components, and other structural shapes. Direct rovings comprising glass fibers of the present invention can be used in a number of downstream processes including, without limitation, filament winding, multi-axial weaving, pultrusion, and other processes in which direct rovings are used. Non-limiting examples of various direct roving or gun roving fiber glass properties are provided in Table 2 below:

TABLE 2

| Product No. | Tex (g/km) (nominal) | Fiber Diameter (μm) (nominal) |
|---|---|---|
| 9 | 1100 | 17 |
| 10 | 600 | 17 |
| 11 | 2400 | 17 |
| 12 | 2400 | 17 |
| 13 | 1200 | 17 |
| 14 | 1200 | 17 |
| 15 | 4400 | 24 |
| 16 | 1984 | 17 |
| 17 | 240 | 12 |
| 18 | 240 | 12 |

In general, such products can have broad application as reinforcements. Product Nos. 9-11, 13, and 15-16 can be continuous fiber, single strand rovings that can be used in pultrusion applications. Such Products can be used to reinforce, for example, polyester, vinylester, and epoxy resins. Thus, in some such embodiments, these Products can be coated with a sizing composition that is compatible with a variety of resin systems including, without limitation, polyester, vinylester, and epoxy resins. Examples of end products resulting from pultrusion processes include, without limitation, grating, deck panels, truck door panels, dunnagebars, sewage treatment components, and other standard structural shapes.

Product Nos. 12 and 14 can be continuous fiber, single strand rovings that can be used in filament winding, pultrusion, weaving, and non-woven fabric applications. Such Products can be used to reinforce, for example, polyester, vinylester, and epoxy resins. Thus, in some such embodiments, these Products can be coated with a sizing composition that is compatible with a variety of resin systems including, without limitation, polyester, vinylester, and epoxy resins.

Product 17 is an example of a product that can be used as a gun roving in contact molding applications. In some embodiments, the Product can be formulated for use with unsaturated polyester resin systems and can be suitable for use with a wide variety of spraying equipment. Thus, in some such embodiments, the Product can be coated with a sizing composition that is compatible with an unsaturated polyester resin while providing rapid wet through and complete wet out.

Product 18 is a fiber glass strand that can be combined with other strands to provide a high end count roving for use in long blade cutter systems to produce, for example and without limitation, fine, evenly distributed chopped fiber layers on multi-axial, unidirectional, and/or randomly-oriented reinforcing mats. In some embodiments, the Products can be coated with a sizing composition that is compatible with polyester and epoxy resin systems.

As indicated above, various sizing compositions known to those of skill in the art can be used on such fiber glass products depending on the type of product, compatibility with the resin system to be reinforced, the ultimate end product, downstream processing steps, and other factors.

Chopped Strand Products

In some embodiments, glass fibers formed from glass compositions of the present invention can be provided as chopped strands for use in a wide variety of resin systems and fabrication processes. In some embodiments, the chopped strands can be used to form composites where hydrolysis resistance is desired. Non-limiting examples of various chopped fiber glass properties are provided in Table 3 below:

TABLE 3

| Product No. | Tex (g/km) (nominal) | Fiber Diameter (µm) (nominal) | Chop Length (inch) (nominal) |
| --- | --- | --- | --- |
| 19 | 889 | 10 | 0.125 |
| 20 | 1747 | 13 | 0.125 |
| 21 | 1747 | 13 | 0.125 |

In general, such products can have broad application as reinforcements. Product No. 19 is a chopped strand that can be used to reinforce, for example, a wide range of polyamide resins. Thus, in some such embodiments, the Product can be coated with a sizing composition that is compatible with various polyamide resins. In some embodiments, the Product can combine excellent feeding characteristics, high gloss, and/or desirable dry-as-molded mechanical properties. The Product, in some embodiments, can provide desirable hydrolysis resistance in ethylene glycol-based cooling systems and/or desirable performance in impact-modified resins. Examples of potential end-use products incorporating the Product can include, without limitation, transportation components, electrical and electronic appliance components, and computer housings and components.

Product No. 20 is a chopped strand that can be used to reinforce, for example, a variety of thermoplastic polyester resins. The Product can also provide desirable reinforcement properties when reinforcing other thermoplastics including, without limitation, sytrenic copolymer resins, polycarbonate resins, polybutylene terephthalate (PBT) resins, polyethylene terpephthalate (PET) resins, polyoxymethylene (POM) resins, and polyphenylene sulfide (PPS) resins. Thus, in some such embodiments, the Product can be coated with a sizing composition that is compatible with such resins. Examples of potential end-use products incorporating the Product can include, without limitation, transportation components, electrical and electronic appliance components, and computer housings and components.

Product No. 21 is a chopped strand that can be used to reinforce, for example, a variety of thermoplastic polybutylene terephthalate (PBT) resins. Thus, in some such embodiments, the Product can be coated with a sizing composition that is compatible with such resins. The Product can be used, for example and without limitation, in high end applications where mechanical properties are important. In some embodiments, the Product can combine desirable feeding characteristics, desirable hydrolysis resistance, and/or desirable dry-as-molded mechanical properties. Examples of potential end-use products incorporating the Product can include, without limitation, transportation components, electrical and electronic appliance components, and computer housings and components.

As indicated above, various sizing compositions known to those of skill in the art can be used on such fiber glass products depending on the type of product, compatibility with the resin system to be reinforced, the ultimate end product, downstream processing steps, and other factors.

Specialty Yarns

In some embodiments, glass fibers formed from glass compositions of the present invention can be provided as yarns for use in the weaving of fabrics. Such fabrics can be used, for example, in filtration applications, high temperature applications, and other industrial uses. Non-limiting examples of various yarn properties are provided in Table 4 below:

TABLE 4

| Product No. | Tex (g/km) (nominal) | Fiber Diameter (μm) (nominal) | Twist |
|---|---|---|---|
| 22 | 66 | 6.5 | 1.0Z |
| 23 | 136 | 10 | 0.7Z |
| 24 | 66 | 6.5 | 1.0Z |
| 25 | 34 | 10 | 1.0Z |
| 26 | 300 | 13 | 0.5Z |

The yarns can be texturized yarns or bobbin/plied yarns depending on the desired application. Texturized yarns are understood to those of skill in the art to be continuous, single end or multi-end, product that have been volumized to provide higher bulk, thickness, and coverage per weight than standard fiber glass yarns. Such texturized yarns can be used, for example, in weaving high temperature and filtration fabrics, as well as other industrial uses.

Bobbin yarns typically comprise a single strand of continuous fibers that have been twisted and wound on a bobbin. Such yarns can have high heat resistance, low moisture absorbency, and/or superior electrical properties.

Various sizing compositions known to those of skill in the art can also be used on such fiber glass products depending on the type of product, compatibility with the resin system to be reinforced, the ultimate end product, downstream processing steps, and other factors.

Long Fiber Thermoplastic Reinforcements

In some embodiments, glass fibers formed from glass compositions of the present invention can be provided as long fiber reinforcements (e.g., having a length of 3 mm or more in some embodiments, greater than 50 mm in some embodiments, or up to about 25 mm in some embodiments). Such long fiber reinforcements can be used, for example, in the reinforcement of thermoplastic polymers such as thermoplastic polyethylene and polypropylene and thermoplastic polyesters such as polybutylene terephthalate (PBT) or polyethylene terephthalate (PET). The long fiber reinforcements can be used, for example, in granular long-fiber technology (G-LFT) processes, direct long-fiber technology processes, and/or continuous long-fiber technology (C-LFT) processes. One non-limiting example of fiber glass properties for such applications is provided in Table 5 below:

TABLE 5

| Product No. | Tex (g/km) (nominal) | Fiber Diameter (μm) (nominal) |
|---|---|---|
| 27 | 2400 | 17 |

The fiber glass product can be used in the various LFT processes to reinforce thermoplastic polymers and can, in some embodiments, permit molders to produce structural or semi-structural parts. Examples of such parts can include, for example, car instrument panels, inside panels of doors, and floor covers.

Various sizing compositions known to those of skill in the art can also be used on such fiber glass products depending on the type of product, compatibility with the resin system to be reinforced, the ultimate end product, downstream processing steps, and other factors.

Various non-limiting embodiments of the present invention will now be illustrated in the following, non-limiting examples.

EXAMPLES

Examples 1 through 6 of glass compositions of the present invention provided in Table I were prepared by providing mixtures of ingredients covering 65-72 weight percent perlite, 0-22 weight percent dolomite, 6-35 weight percent limestone and 0-8 weight percent soda. The specific amounts of perlite, dolomite, limestone and/or soda used to produce Examples 1 through 6 were determined by reference to the compositional parameters of each mineral in relation to the desired compositional parameters of each glass composition. Mixtures of the minerals were subsequently heated to a temperature of about 1400° C. to obtain molten glass compositions. The molten glass compositions were cooled to provide glass compositions of Examples 1 through 6.

TABLE I

| | Glass Compositions | | | | | | | | | | | |
|---|---|---|---|---|---|---|---|---|---|---|---|---|
| Ex. | $SiO_2$ | $Al_2O_3$ | CaO | MgO | $Na_2O$ | $K_2O$ | $R_2O$ | $Fe_2O_3$ | $TiO_2$ | $SO_3$ | F | $M_xO_y$ |
| 1 | 59.29 | 10.84 | 20.37 | 3.00 | 2.82 | 3.06 | 5.88 | 0.48 | 0.14 | 0.00 | 0.00 | 0.00 |
| 2 | 59.29 | 10.84 | 19.37 | 4.00 | 2.82 | 3.06 | 5.88 | 0.48 | 0.14 | 0.00 | 0.00 | 0.00 |
| 3 | 59.29 | 10.84 | 18.87 | 4.50 | 2.82 | 3.06 | 5.88 | 0.48 | 0.14 | 0.00 | 0.00 | 0.00 |
| 4 | 59.29 | 10.84 | 18.37 | 5.00 | 2.82 | 3.06 | 5.88 | 0.48 | 0.14 | 0.00 | 0.00 | 0.00 |
| 5 | 54.41 | 9.95 | 25.68 | 4.00 | 2.76 | 2.59 | 5.38 | 0.47 | 0.14 | 0.00 | 0.00 | 0.00 |
| 6 | 59.29 | 10.84 | 23.37 | 0.00 | 2.82 | 3.06 | 5.88 | 0.48 | 0.14 | 0.00 | 0.00 | 0.00 |

Examples 7 through 13 of glass compositions of the present invention provided in Table II were prepared by providing mixtures of ingredients covering 69-71 weight percent perlite, 6-20 weight percent limestone and 7-10 weight percent soda. The specific amounts of perlite, limestone and soda used to produce Examples 7 through 13 were determined by reference to the compositional parameters of each mineral in relation to the desired compositional parameters of each glass composition. Mixtures of the minerals were subsequently heated to a temperature of about 1400° C. to obtain molten glass compositions. The molten glass compositions were cooled to provide glass compositions of Examples 7 through 13.

TABLE II

| | Glass Compositions | | | | | | | | | | | |
|---|---|---|---|---|---|---|---|---|---|---|---|---|
| Ex. | $SiO_2$ | $Al_2O_3$ | CaO | MgO | $Na_2O$ | $K_2O$ | $R_2O$ | $Fe_2O_3$ | $TiO_2$ | $SO_3$ | F | $M_xO_y$ |
| 7 | 62.66 | 11.46 | 9.28 | 2.98 | 9.20 | 3.23 | 12.43 | 0.51 | 0.14 | 0.25 | 0.30 | 0.00 |
| 8 | 61.11 | 11.17 | 14.03 | 0.00 | 9.29 | 3.15 | 12.42 | 0.49 | 0.14 | 0.32 | 0.30 | 0.00 |
| 9 | 62.61 | 11.45 | 11.26 | 0.00 | 10.19 | 3.23 | 13.42 | 0.51 | 0.14 | 0.32 | 0.30 | 0.00 |
| 10 | 61.13 | 11.17 | 13.04 | 0.00 | 10.19 | 3.23 | 13.42 | 0.49 | 0.14 | 0.32 | 0.30 | 0.00 |
| 11 | 58.93 | 10.76 | 12.57 | 0.00 | 10.34 | 2.60 | 13.22 | 0.47 | 3.00 | 0.09 | 0.28 | 0.95* |
| 12 | 58.93 | 10.76 | 12.57 | 0.00 | 10.34 | 2.60 | 13.22 | 0.47 | 1.08 | 0.09 | 0.28 | 2.87* |
| 13 | 57.47 | 10.78 | 9.12 | 0.00 | 10.44 | 3.05 | 13.49 | 0.62 | 0.15 | 0.09 | 0.28 | 8.00* |

*$ZrO_2$ and $TiO_2$ were added to the batch composition used to produce the glass composition.

Examples 14 through 19 of glass compositions of the present invention provided in Table III were prepared by providing mixtures of ingredients covering 69-72 weight percent perlite, 0-13 weight percent dolomite, 3-17 weight percent limestone and 7-10 weight percent soda. The specific amounts of perlite, limestone, soda and/or dolomite used to produce Examples 14 through 19 were determined by reference to the compositional parameters of each mineral in relation to the desired compositional parameters of each glass composition. Mixtures of the minerals were subsequently heated to a temperature of about 1400° C. to obtain molten glass compositions. The molten glass compositions were cooled to provide glass compositions of Examples 14 through 19.

TABLE III

| | Glass Compositions | | | | | | | | | | | |
|---|---|---|---|---|---|---|---|---|---|---|---|---|
| Ex. | $SiO_2$ | $Al_2O_3$ | CaO | MgO | $Na_2O$ | $K_2O$ | $R_2O$ | $Fe_2O_3$ | $TiO_2$ | $SO_3$ | F | $M_xO_y$ |
| 14 | 62.62 | 11.45 | 10.77 | 0.00 | 10.69 | 3.23 | 13.92 | 0.51 | 0.14 | 0.30 | 0.30 | 0.00 |
| 15 | 61.91 | 11.38 | 7.99 | 3.00 | 11.21 | 3.27 | 14.48# | 0.60 | 0.14 | 0.20 | 0.00 | 1.0#/0.30* |
| 16 | 63.65 | 11.93 | 4.39 | 2.56 | 13.04 | 3.37 | 16.41 | 0.70 | 0.17 | 0.20 | 0.00 | 0.00 |
| 17 | 61.14 | 11.17 | 12.05 | 0.00 | 11.26 | 3.15 | 14.41 | 0.49 | 0.14 | 0.30 | 0.30 | 0.00 |
| 18 | 61.65 | 11.29 | 10.94 | 0.00 | 11.73 | 3.18 | 14.92 | 0.52 | 0.14 | 0.25 | 0.30 | 0.00 |
| 19 | 61.65 | 11.29 | 7.96 | 2.98 | 11.73 | 3.18 | 14.92 | 0.52 | 0.14 | 0.30 | 0.25 | 0.00 |

1 wt % $Li_2O$ replaced 1 wt % $Na_2O$; $Sb_2O_3$ used in refining removed
*$Sb_2O_3$ used for refining Examples 20 through 37 of glass compositions of the present invention provided in Table IV were prepared by providing mixtures of ingredients covering 68-73 weight percent perlite, 0-13 weight percent dolomite, 4-16 weight percent limestone and 12-17 weight percent soda. The specific amounts of perlite, limestone, soda and/or dolomite used to produce Examples 20 through 37 were determined by reference to the compositional parameters of each mineral in relation to the desired compositional parameters of each glass composition. Mixtures of the minerals were subsequently heated to a temperature of about 1400° C. to obtain molten glass compositions. The molten glass compositions were cooled to provide glass compositions of Examples 20 through 37.

TABLE IV

| | Glass Compositions | | | | | | | | | | | |
|---|---|---|---|---|---|---|---|---|---|---|---|---|
| Ex. | $SiO_2$ | $Al_2O_3$ | CaO | MgO | $Na_2O$ | $K_2O$ | $R_2O$ | $Fe_2O_3$ | $TiO_2$ | $SO_3$ | F | $M_xO_y$ |
| 20 | 61.14 | 11.17 | 11.05 | 0.00 | 12.26 | 3.15 | 15.41 | 0.49 | 0.14 | 0.30 | 0.30 | 0.00 |
| 21 | 60.78 | 11.10 | 11.65 | 0.00 | 12.31 | 3.13 | 15.44 | 0.50 | 0.14 | 0.20 | 0.20 | 0.00 |
| 22 | 60.74 | 11.09 | 8.65 | 2.99 | 12.31 | 3.13 | 15.44 | 0.50 | 0.14 | 0.20 | 0.25 | 0.00 |
| 23 | 61.01 | 10.77 | 8.25 | 2.97 | 12.30 | 3.91 | 16.20 | 0.58 | 0.07 | 0.02 | 0.12 | 0.00 |
| 24 | 60.64 | 10.71 | 8.80 | 2.96 | 12.22 | 3.88 | 16.10 | 0.58 | 0.07 | 0.02 | 0.12 | 0.00 |
| 25 | 60.94 | 10.76 | 8.79 | 2.54 | 12.28 | 3.90 | 16.18 | 0.58 | 0.07 | 0.02 | 0.12 | 0.00 |
| 26 | 60.22 | 10.63 | 9.15 | 2.52 | 10.54 | 3.86 | 14.40 | 2.88 | 0.07 | 0.02 | 0.11 | 0.00 |

TABLE IV-continued

Glass Compositions

| Ex. | SiO$_2$ | Al$_2$O$_3$ | CaO | MgO | Na$_2$O | K$_2$O | R$_2$O | Fe$_2$O$_3$ | TiO$_2$ | SO$_3$ | F | M$_x$O$_y$ |
|---|---|---|---|---|---|---|---|---|---|---|---|---|
| 27 | 60.92 | 10.76 | 8.24 | 2.97 | 12.28 | 3.90 | 16.18 | 0.58 | 0.07 | 0.18 | 0.12 | 0.00 |
| 28 | 60.55 | 10.69 | 8.78 | 2.96 | 12.20 | 3.88 | 16.08 | 0.58 | 0.07 | 0.18 | 0.12 | 0.00 |
| 29 | 60.84 | 10.74 | 8.77 | 2.54 | 12.26 | 3.90 | 16.15 | 0.58 | 0.07 | 0.18 | 0.12 | 0.00 |
| 30 | 60.12 | 10.62 | 9.13 | 2.51 | 10.53 | 3.85 | 14.38 | 2.88 | 0.07 | 0.17 | 0.11 | 0.00 |
| 31 | 55.33 | 9.77 | 12.86 | 5.38 | 4.59 | 3.54 | 8.13 | 0.54 | 0.06 | 0.07 | 0.11 | 7.75* |
| 32 | 58.03 | 10.25 | 13.49 | 5.64 | 4.81 | 3.71 | 8.53 | 0.56 | 0.07 | 0.07 | 0.11 | 3.25* |
| 33 | 55.59 | 9.82 | 6.17 | 3.06 | 10.03 | 3.56 | 13.59 | 0.53 | 0.06 | 0.07 | 0.11 | 11.01** |
| 34 | 62.34 | 14.32 | 11.20 | 0.38 | 9.04 | 2.17 | 11.21 | 0.34 | 0.04 | 0.11 | 0.06 | 0.00 |
| 35 | 62.87 | 11.50 | 7.98 | 0.00 | 13.25 | 3.24 | 16.50 | 0.51 | 0.14 | 0.30 | 0.20 | 0.00 |
| 36 | 61.14 | 11.17 | 10.06 | 0.00 | 13.25 | 3.15 | 16.40 | 0.49 | 0.14 | 0.30 | 0.30 | 0.00 |
| 37 | 60.25 | 11.01 | 9.00 | 1.98 | 12.70 | 3.54 | 16.24 | 0.81 | 0.03 | 0.12 | 0.00 | 0.00 |

*B$_2$O$_3$ used as additives
**ZnO used to replace 1 wt % Na$_2$O and 1 wt % CaO plus Sb$_2$O$_3$ removal The glass composition of Example 38 provided in Table V was prepared in accordance with the glass composition of Example 12 above, except 1 wt % Li$_2$O was used to replace 1 wt % Na$_2$O and any Sb$_2$O$_3$ used during refining was removed. The glass composition of Example 39 in Table V was prepared in accordance with the glass composition of Example 12 above, except ZnO was used to replace 1 wt % Na$_2$O and 1 wt % CaO and any Sb$_2$O$_3$ used during refining was removed.

TABLE V

Glass Compositions

| Ex. | SiO$_2$ | Al$_2$O$_3$ | CaO | MgO | Na$_2$O | K$_2$O | R$_2$O | Fe$_2$O$_3$ | TiO$_2$ | SO$_3$ | F | M$_x$O$_y$ |
|---|---|---|---|---|---|---|---|---|---|---|---|---|
| 38 | 61.93 | 11.34 | 7.99 | 3.00 | 10.29 | 3.20 | 13.49 | 0.52 | 0.14 | 0.30 | 0.30 | 1.00 |
| 39 | 61.93 | 11.34 | 6.99 | 3.00 | 10.29 | 3.20 | 13.49 | 0.52 | 0.14 | 0.30 | 0.30 | 2.00 |

Examples 40 through 71 of glass compositions of the present invention provided in Table VI were prepared in accordance with the glass composition of Example 12 above, except the glass compositions were designed to include various combinations of Li$_2$O, La$_2$O$_3$, MnO$_2$, TiO$_2$, ZnO and ZrO$_2$. Various amounts of Li$_2$CO$_3$, La$_2$O$_3$, MnO$_2$, TiO$_2$, ZnO and ZrO$_2$ were incorporated into the batch composition of Example 12 to produce Examples 39-70. Moreover, each of the glass compositions of Examples 39-70 also included 0.09 wt % SO$_3$, 0.27-0.28 wt % F and 0.53-0.55 wt % Fe$_2$O$_3$.

TABLE VI

Glass Compositions

| Ex. | SiO$_2$ | Al$_2$O$_3$ | CaO | MgO | Na$_2$O | K$_2$O | R$_2$O | Li$_2$O | ZnO | ZrO$_2$ | TiO$_2$ | La$_2$O$_3$ | MnO$_2$ |
|---|---|---|---|---|---|---|---|---|---|---|---|---|---|
| 40 | 56.70 | 10.43 | 7.32 | 2.74 | 10.23 | 2.98 | 13.21 | 0.46 | 0.91 | 0.91 | 2.74 | 0.91 | 2.74 |
| 41 | 56.70 | 10.43 | 7.32 | 2.74 | 10.23 | 2.98 | 13.21 | 0.46 | 2.74 | 0.91 | 2.74 | 0.91 | 0.91 |
| 42 | 57.22 | 10.52 | 7.38 | 2.77 | 10.33 | 3.01 | 13.34 | 1.38 | 0.92 | 2.77 | 0.92 | 0.92 | 0.92 |
| 43 | 54.70 | 10.06 | 7.06 | 2.65 | 9.87 | 2.87 | 12.75 | 0.44 | 2.65 | 0.88 | 2.65 | 2.65 | 2.65 |
| 44 | 55.18 | 10.15 | 7.12 | 2.67 | 9.96 | 2.90 | 12.86 | 1.34 | 2.67 | 0.89 | 0.89 | 2.67 | 2.67 |
| 45 | 53.29 | 9.80 | 6.88 | 2.58 | 9.62 | 2.80 | 12.42 | 1.29 | 2.58 | 2.58 | 2.58 | 2.58 | 2.58 |
| 46 | 54.70 | 10.06 | 7.06 | 2.65 | 9.87 | 2.87 | 12.75 | 0.44 | 2.65 | 2.65 | 0.88 | 2.65 | 2.65 |
| 47 | 55.18 | 10.15 | 7.12 | 2.67 | 9.96 | 2.90 | 12.86 | 1.34 | 0.89 | 2.67 | 2.67 | 0.89 | 2.67 |
| 48 | 58.85 | 10.82 | 7.59 | 2.85 | 10.62 | 3.09 | 13.72 | 0.47 | 0.95 | 0.95 | 0.95 | 0.95 | 0.95 |
| 49 | 56.70 | 10.43 | 7.32 | 2.74 | 10.23 | 2.98 | 13.21 | 0.46 | 0.91 | 2.74 | 0.91 | 2.74 | 0.91 |
| 50 | 56.70 | 10.43 | 7.32 | 2.74 | 10.23 | 2.98 | 13.21 | 0.46 | 2.74 | 0.91 | 0.91 | 2.74 | 0.91 |
| 51 | 55.18 | 10.15 | 7.12 | 2.67 | 9.96 | 2.90 | 12.86 | 1.34 | 2.67 | 0.89 | 2.67 | 2.67 | 0.89 |
| 52 | 55.18 | 10.15 | 7.12 | 2.67 | 9.96 | 2.90 | 12.86 | 1.34 | 2.67 | 2.67 | 0.89 | 2.67 | 0.89 |
| 53 | 54.70 | 10.06 | 7.06 | 2.65 | 9.87 | 2.87 | 12.75 | 0.44 | 2.65 | 2.65 | 0.88 | 2.65 | 2.65 |
| 54 | 56.70 | 10.43 | 7.32 | 2.74 | 10.23 | 2.98 | 13.21 | 0.46 | 0.91 | 0.91 | 2.74 | 2.74 | 0.91 |
| 55 | 55.18 | 10.15 | 7.12 | 2.67 | 9.96 | 2.90 | 12.86 | 1.34 | 0.89 | 0.89 | 2.67 | 2.67 | 2.67 |
| 56 | 55.18 | 10.15 | 7.12 | 2.67 | 9.96 | 2.90 | 12.86 | 1.34 | 0.89 | 2.67 | 2.67 | 2.67 | 0.89 |
| 57 | 56.70 | 10.43 | 7.32 | 2.74 | 10.23 | 2.98 | 13.21 | 0.46 | 0.91 | 2.74 | 0.91 | 0.91 | 2.74 |
| 58 | 57.22 | 10.52 | 7.38 | 2.77 | 10.33 | 3.01 | 13.34 | 1.38 | 2.77 | 0.92 | 0.92 | 0.92 | 0.92 |
| 59 | 55.18 | 10.15 | 7.12 | 2.67 | 9.96 | 2.90 | 12.86 | 1.34 | 2.67 | 0.89 | 2.67 | 0.89 | 2.67 |
| 60 | 56.70 | 10.43 | 7.32 | 2.74 | 10.23 | 2.98 | 13.21 | 0.46 | 0.91 | 0.91 | 0.91 | 2.74 | 2.74 |
| 61 | 57.22 | 10.52 | 7.38 | 2.77 | 10.33 | 3.01 | 13.34 | 1.38 | 0.92 | 0.92 | 2.77 | 0.92 | 0.92 |
| 62 | 55.18 | 10.15 | 7.12 | 2.67 | 9.96 | 2.90 | 12.86 | 1.34 | 2.67 | 2.67 | 2.67 | 0.89 | 0.89 |
| 63 | 56.70 | 10.43 | 7.32 | 2.74 | 10.23 | 2.98 | 13.21 | 0.46 | 2.74 | 2.74 | 0.91 | 0.91 | 0.91 |
| 64 | 54.70 | 10.06 | 7.06 | 2.65 | 9.87 | 2.87 | 12.75 | 0.44 | 0.88 | 2.65 | 2.65 | 2.65 | 2.65 |
| 65 | 57.22 | 10.52 | 7.38 | 2.77 | 10.33 | 3.01 | 13.34 | 1.38 | 0.92 | 0.92 | 0.92 | 0.92 | 2.77 |
| 66 | 55.18 | 10.15 | 7.12 | 2.67 | 9.96 | 2.90 | 12.86 | 1.34 | 0.89 | 2.67 | 0.89 | 2.67 | 2.67 |

TABLE VI-continued

Glass Compositions

| Ex. | SiO$_2$ | Al$_2$O$_3$ | CaO | MgO | Na$_2$O | K$_2$O | R$_2$O | Li$_2$O | ZnO | ZrO$_2$ | TiO$_2$ | La$_2$O$_3$ | MnO$_2$ |
|---|---|---|---|---|---|---|---|---|---|---|---|---|---|
| 67 | 54.70 | 10.06 | 7.06 | 2.65 | 9.87 | 2.87 | 12.75 | 0.44 | 2.65 | 2.65 | 2.65 | 2.65 | 0.88 |
| 68 | 56.70 | 10.43 | 7.32 | 2.74 | 10.23 | 2.98 | 13.21 | 0.46 | 2.74 | 0.91 | 0.91 | 0.91 | 2.74 |
| 69 | 55.18 | 10.15 | 7.12 | 2.67 | 9.96 | 2.90 | 12.86 | 1.34 | 2.67 | 2.67 | 0.89 | 0.89 | 2.67 |
| 70 | 57.22 | 10.52 | 7.38 | 2.77 | 10.33 | 3.01 | 13.34 | 1.38 | 0.92 | 0.92 | 0.92 | 2.77 | 0.92 |
| 71 | 56.70 | 10.43 | 7.32 | 2.74 | 10.23 | 2.98 | 13.21 | 0.46 | 0.91 | 2.74 | 2.74 | 0.91 | 0.91 |

Examples 72 through 74 of glass compositions of the present invention provided in Table VII may be prepared by providing mixtures of ingredients covering 11-41 weight percent perlite, 0-55 weight percent dolomite, 12-17 weight percent limestone, 0-30 weight percent alkali aluminosilicate mineral, 34-56 weight percent silica, 0-19 weight percent clay (kaolinite), and 1-3 weight percent rouge. The specific amounts of perlite, dolomite, alkali aluminosilicate mineral, silica, clay and/or rouge used to produce Examples 72 through 74 were determined by reference to the compositional parameters of each mineral in relation to the desired compositional parameters of each glass composition. Mixtures of the minerals are heated to a temperature of about 1400° C. to obtain molten glass compositions. The molten glass compositions are cooled to provide glass compositions of Examples 72 through 74.

TABLE VII

Glass Compositions

| Ex. | SiO$_2$ | Al$_2$O$_3$ | CaO | MgO | Na$_2$O | K$_2$O | TiO$_2$ | Fe$_2$O$_3$ |
|---|---|---|---|---|---|---|---|---|
| 72 | 61.60 | 10.64 | 11.27 | 0.56 | 13.10 | 2.38 | 0.01 | 0.44 |
| 73 | 61.56 | 10.68 | 11.08 | 0.59 | 13.58 | 2.08 | 0.02 | 0.42 |
| 74 | 62.44 | 10.70 | 10.51 | 1.76 | 12.91 | 0.70 | 0.37 | 0.61 |

Examples 75 and 76 of glass compositions of the present invention provided in Table VIII may be prepared by providing mixtures of ingredients covering 69.8-70.4 weight percent perlite, 13.3-14.3 weight percent soda ash, 15.4-17.1 weight percent limestone. For Example 76, 0.3 weight percent manganese dioxide was added. The specific amounts of perlite, soda ash, limestone, and manganese dioxide to produce Examples 75-76 were determined by reference to the compositional parameters of each mineral in relation to the desired compositional parameters of the glass composition. Mixtures of the minerals are heated to a temperature of about 1400° C. to obtain the molten glass composition. The molten glass composition is cooled to provide the glass compositions of Examples 75-76.

TABLE VIII

Glass Compositions

| Ex. | SiO$_2$ | Al$_2$O$_3$ | CaO | MgO | Na$_2$O | K$_2$O | TiO$_2$ | Fe$_2$O$_3$ | MnO2 |
|---|---|---|---|---|---|---|---|---|---|
| 75 | 61.43 | 10.64 | 10.48 | 0.18 | 12.82 | 4.00 | 0.04 | 0.46 | 0.00 |
| 76 | 61.20 | 10.60 | 10.40 | 0.20 | 12.81 | 3.99 | 0.04 | 0.47 | 0.32 |

I. Melt Properties

The melt properties of several glass compositions of Examples 1 through 71 were investigated. Investigation of the melt properties of glass compositions of the present invention assisted in the determination of how various compositional parameters affect processing considerations including forming temperatures ($T_F$) and liquidus ($T_L$) temperatures of the glass compositions.

Figure 2:
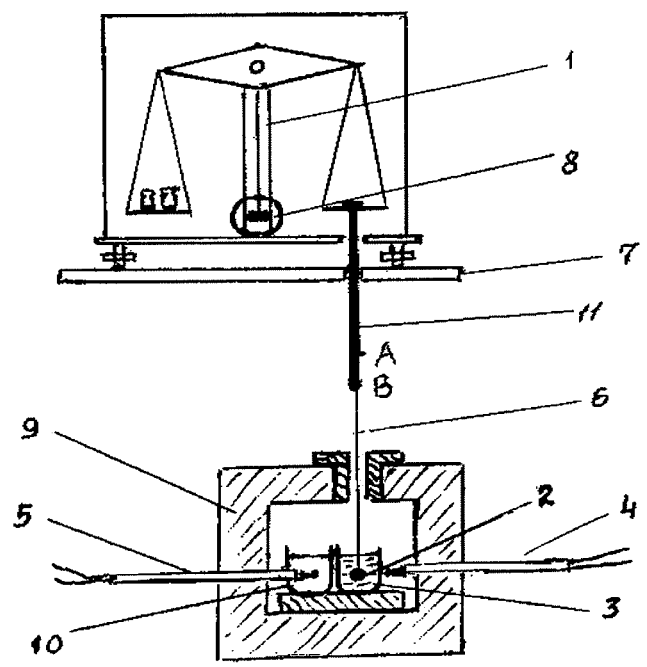
FIG. 2 illustrates an apparatus used in the determination of melt viscosities of glass compositions according to embodiments of the present invention.

The measurement of melt viscosity for determining forming temperatures of various glass compositions of the present invention was done by the counter-balance method over the viscosity range of $10^2$-$10^5$ Poise. The apparatus used to execute the method was calibrated using NIST standard glass. FIG. 2 shows schematics of the apparatus.

The apparatus (1) for measuring melt viscosity comprised a platinum ball (2) with a diameter of 16 mm. The platinum ball (2) was hung on a thin platinum wire (6) with the help of a special bracket/holder (11) attached to the right scale of the analytical balance. Initially, the first the end of the platinum wire (6) was attached to the bracket/holder at point A. After warming the furnace (9), the platinum ball was placed in the sample melt inside the crucible (3) and the first end of the wire was attached to the bracket/holder at point B to locate the platinum ball (2) in the center of the melt. The distance between the platinum ball (2) and the walls of the crucible (3) was 13-15 mm. If the distance were smaller, it would affect the precision of the measurement.

The movement of the platinum ball (3) in the melt was performed by changing the weight of the rider. The speed of the movement of the ball in the melt was defined in relative numbers of the balance indicator shift that was observed on the balance scale. When the balance indicator moved 100 points to both sides from zero position, the ball in the melt shifted 1.7 mm from the central position up and down. The sensitivity of the balance was 10 mg per 100 points. A Pt/PtRh thermocouple was placed in the furnace next to the crucible (3) and provided automatic temperature control of the furnace. The hot end of another thermocouple (5) was inside the crucible (10) filled with Al$_2$O$_3$ powder. This thermocouple was connected with the potentiometer to control the furnace temperature at the set point. The temperature control had a precision ±1.5° C.

During the testing, the platinum ball (2) moved from a marked upper position in the melt to a lower marked position under its gravity, the time of which was recorded using a stopwatch with the precision within 0.1 second. The time of the balance scale shift to 20-60 scale divisions was measured depending on the viscosity of the melt. The speed of the platinum ball (2) movement (per scale division/seconds) was taken as an average value of six measurements.

Using the velocity (V)-weight (G) data, a plot of V-G was constructed for each glass composition under investigation, all of which showed straight lines passing through the point of origin of the V-G coordinates. The slope k of each line was correlated with melt viscosity in a form of:

$$\log \eta = a^* \log(tgk) + b$$

where a (1.09) and b (0.87) were constants determined from cell calibration using a NIST standard glass (710A). The relative error in defining viscosity was within 3% over the viscosity range, $2.5 < \log \eta < 3.5$, and within 4-6% over the range, $\log \eta < 2.5$ and $\log \eta > 3.5$.

Figure 3:
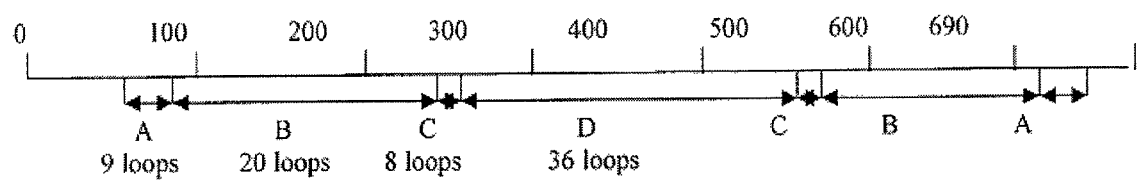
FIG. 3 illustrates the position of the thermocouple and the number of turns of the heating coil of a furnace used in the determination of liquidus temperatures ($T_L$) of glass compositions according to embodiments of the present invention.

The measurement of glass composition liquidus temperature ($T_L$) was conducted in a tube type gradient furnace with maximum temperature 1250° C. The furnace chamber had a dimension of 480 mm in length and 50 mm in diameter. The geometry and dimension of the furnace were close to those recommended by the ASTM C829-81. FIG. 3 illustrates the position of the thermocouple and the number of turns of the heating coil. The coil was made of NiCr resistance alloy wires with diameter of 2 mm.

Table IX summarizes measured liquidus temperature ($T_L$) and reference temperature of forming ($T_F$) defined by melt viscosity of 1000 Poise for glass compositions of Examples 1-22. Glass compositions of Examples 1-6 demonstrated liquidus temperatures greater than 1240° C., the upper limit of the gradient temperature furnace setting. As a result, no viscosity measurements were made for these compositions for a determination of forming temperature. Moreover, several glass compositions displayed desirable melt properties by having lower liquidus and forming temperatures while maintaining a difference in liquidus temperature and forming temperature of at least 65° C. Examples 18, 20 and 21 each provided a forming temperature under 1222° C. while maintaining a difference in liquidus and forming temperature of at least 75° C.

TABLE IX

Melt Properties of Glass Compositions

| Example | $T_L$ (° C.) | $T_F$ (° C.) | Delta T ($T_F - T_L$) (° C.) |
|---|---|---|---|
| 1 | 1235 | 1226 | −9 |
| 2 | >1240 | | |
| 3 | >1240 | | |
| 4 | >1240 | | |
| 5 | >1240 | | |
| 6 | >1240 | | |
| 7 | | 1296 | |
| 8 | 1190 | 1265 | 75 |
| 9 | | 1290 | |
| 10 | 1185 | 1246 | 61 |
| 11 | 1190 | 1236 | 46 |
| 12 | 1130 | 1265 | 135 |
| 13 | 1185 | 1224 | 39 |
| 14 | 1155 | 1248 | 93 |
| 15 | 1085 | 1250 | 165 |
| 16 | 1170 | 1225 | 55 |
| 17 | 1180 | 1204 | 24 |
| 18 | 1135 | 1222 | 87 |
| 19 | 1090 | 1252 | 162 |
| 20 | 1140 | 1220 | 80 |
| 21 | 1130 | 1205 | 75 |
| 22 | 1120 | 1262 | 142 |

Table X summarizes measured liquidus temperature ($T_L$) and the forming ($T_F$) temperature for glass compositions of Examples 40 through 71 as a function of weight percent of $Li_2O$ in the glass compositions. As provided in Table X, $Li_2O$ plays a significant role in lowering the liquidus and forming temperatures of glass compositions of the present invention with minimum reductions in forming and liquidus temperatures being 30° C. and 43° C. respectively.

TABLE X

Melt Properties of Glass Compositions

| High $Li_2O$ (1.5 wt %) | | | | Low $Li_2O$ (0.5 wt %) | | | |
|---|---|---|---|---|---|---|---|
| EX. | $T_F$ ° C. | $T_L$ ° C. | Delta T ° C. | EX. | $T_F$ ° C. | $T_L$ ° C. | Delta T ° C. |
| 42 | 1148 | 1060 | 88 | 40 | 1187 | 1100 | 87 |
| 44 | 1156 | 1054 | 102 | 41 | 1176 | 1073 | 103 |
| 45 | 1157 | 1065 | 92 | 43 | 1165 | 1083 | 82 |
| 47 | 1145 | 1058 | 87 | 46 | 1179 | 1081 | 98 |
| 51 | 1142 | 1067 | 82 | 48 | 1210 | 1096 | 114 |
| 52 | 1158 | 1054 | 104 | 49 | 1210 | 1098 | 112 |
| 55 | 1154 | 1031 | 123 | 50 | 1206 | 1086 | 120 |
| 56 | 1160 | 1024 | 136 | 53 | 1193 | 1084 | 109 |
| 58 | 1164 | 1062 | 102 | 54 | 1205 | 1090 | 115 |
| 59 | 1124 | 1054 | 70 | 57 | 1222 | 1074 | 148 |
| 61 | 1160 | 1054 | 106 | 60 | 1204 | 1087 | 117 |
| 62 | 1148 | 1043 | 105 | 63 | 1215 | 1068 | 147 |
| 65 | 1163 | 1065 | 98 | 64 | 1192 | 1073 | 119 |
| 66 | 1162 | 1057 | 105 | 67 | 1190 | 1073 | 117 |
| 69 | 1154 | 1060 | 94 | 68 | 1190 | 1087 | 103 |
| 70 | 1158 | 1060 | 98 | 71 | 1208 | 1073 | 135 |

Table XI summarizes the measured liquidus temperature ($T_L$) and reference temperature of forming ($T_F$) defined by melt viscosity of 1000 Poise for the glass composition of Examples 75-76.

TABLE XI

Melt Properties of Glass Composition

| Example | $T_L$ (° C.) | $T_F$ (° C.) | Delta T ($T_F - T_L$) (° C.) |
|---|---|---|---|
| 75 | 1137 | 1225 | 88 |
| 76 | 1139 | 1228 | 89 |

Figure 4:
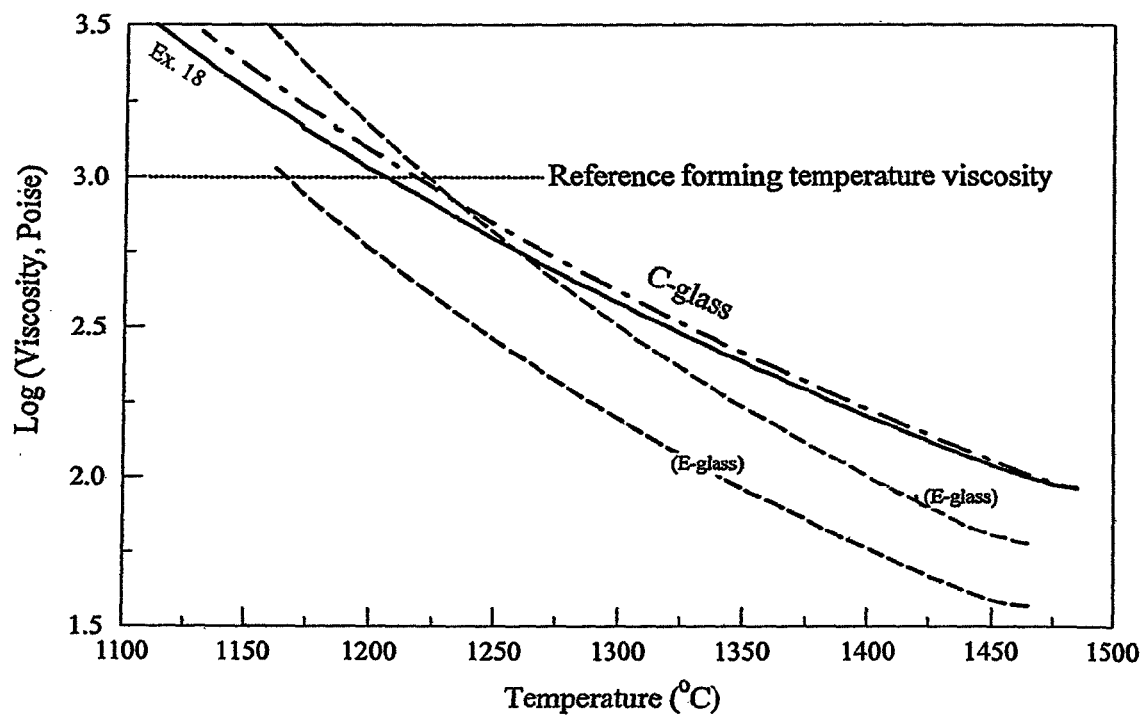
FIG. 4 provides temperature-viscosity curves for a glass composition according to one embodiment of the present invention, two commercially available E-glass compositions and a C-glass composition.

FIG. 4 provides temperature-viscosity curves for the glass composition of Example 18, two E-glass compositions and a C-glass composition. From FIG. 4, it is noted that the temperature-viscosity characteristics of the glass composition of Example 18 are similar to those of the C-glass composition. Moreover, the viscosity change for the glass composition of Example 18 is not as steep as that provided for the E-glass compositions. As a result, the glass composition of claim 18 can be characterized as a "long" glass whereas the E-glass compositions are "short" glasses. Longer glasses, such as Example 18, in principle, favor fine filament production forming due to less forming tension as a result of slower reduction in melt viscosity over the forming temperature range right after fiber exit from the forming tip.

Figure 5:
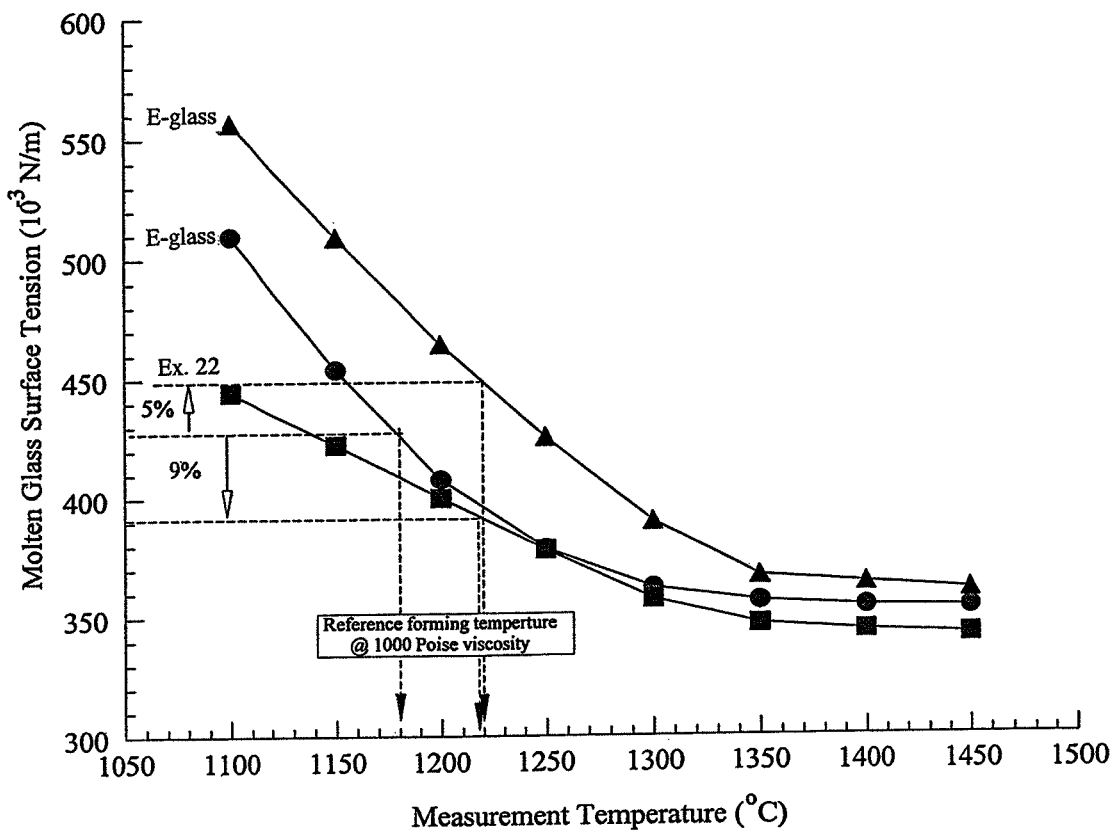
FIG. 5 provides molten glass surface tensions as a function of temperature for a glass composition according to one embodiment of the present invention and two commercially available E-glass compositions.

FIG. 5 further illustrates the reduction in forming tension by providing molten glass surface tensions as a function of temperature for the glass composition of Example 22 in comparison two E-glass compositions. As provided in FIG. 5, the glass composition of Example 22 at the forming temperature has 9% and 14% lower surface tension than the E-glass compositions.

Figure 6:
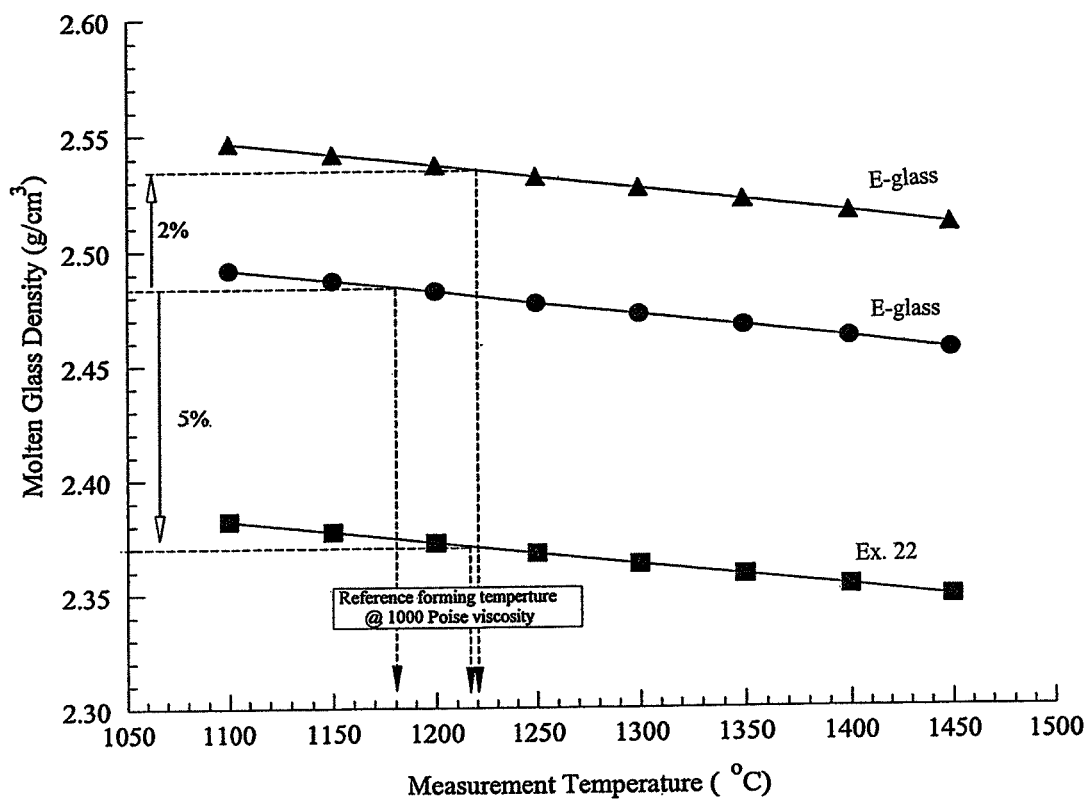
FIG. 6 is a plot of the melt or molten glass density as a function of temperature for a glass composition according to one embodiment of the present invention and two commercially available E-glass compositions.

FIG. 6 is a plot of the melt or molten glass density as a function of temperature for the glass composition of Example 22 in comparison with two E-glass compositions. As provided in FIG. 6, the glass composition of Example 22 demonstrated a temperature dependency (slope) similar to the E-glass compositions but had a molten density 5% and 7% lower than the E-glass compositions respectively. As a result, glass fibers formed from some glass compositions of the present invention are lighter per unit volume in comparison to some E-glass fibers. Lighter glass fibers can be advantageous in many applications, particularly material reinforcement application, such as polymeric reinforcement applications, where weight savings are highly desirable. Moreover, as a result of lower densities, glass fibers formed from some glass compositions of the present invention can have larger diameters in comparison to some E-glass fibers of the same weight, thereby providing enhanced mechanical properties.

Figure 7:
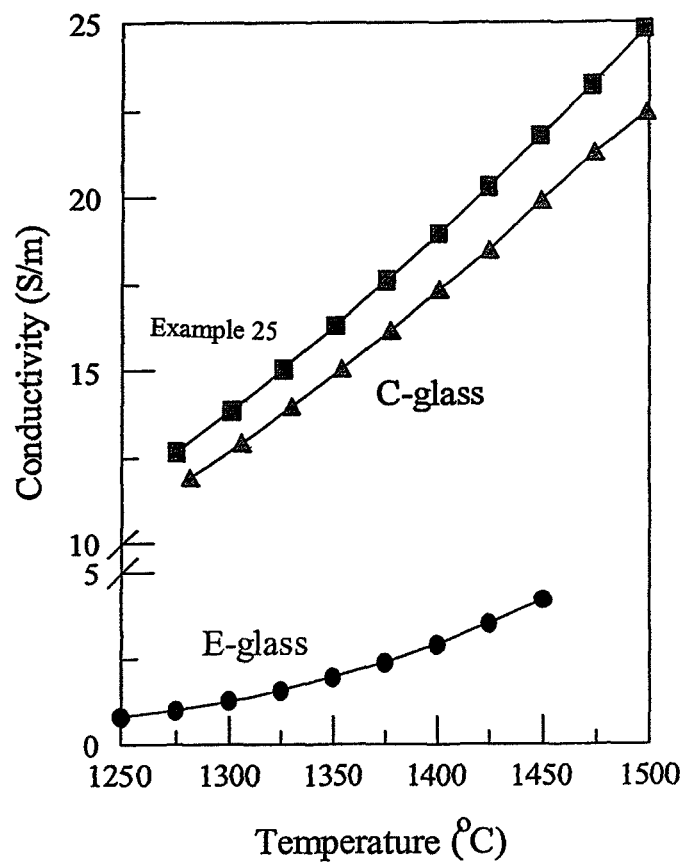
FIG. 7 is a plot of electrical conductivity as a function of temperature for a glass composition according to one embodiment of the present invention as well as E-glass and C-glass compositions.

FIG. 7 is a plot of electrical conductivity as a function of temperature for the glass composition of Example 25 in comparison with E-glass and C-glass compositions. As provided in FIG. 7, the glass composition of Example 25 and the C-glass composition display much higher electrical conductivities than the E-glass due to their significantly higher alkali metal content. The melt conductivity of an inorganic glass composition is generally dominated by the mobile ions of sodium and potassium. As a result of low sodium and potassium ion content in E-glass compositions, electrical melting technology is only used as a secondary boost system for E-glass processing. However, electrical melting technology has been used as a primary energy for the processing of C-glass compositions. Given that glass compositions of the present invention, in some embodiments, demonstrate higher melt conductivities than some C-glass compositions, electrical melting technology may find application to processing glass compositions of the present invention.

Figure 8:
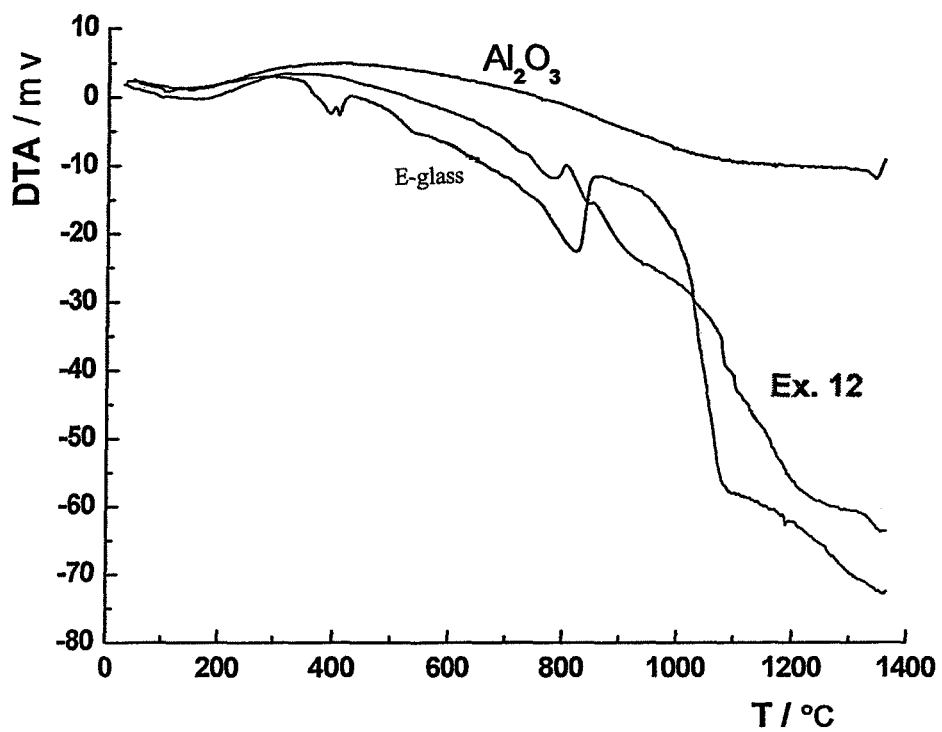
FIG. 8 provides energy requirements for conversion of several batch compositions to glass melt compositions according to one embodiment of the present invention.

Additionally, glass compositions of the present invention formed from batch compositions comprising perlite and/or pumice, in some embodiments, require less energy for converting the batch composition to a glass melt composition. FIG. 8 provides the energy required to convert the batch composition comprising perlite to the glass melt composition of Example 12. FIG. 8 also provides the energy required to convert an E-glass batch composition to the associated glass melt. As shown in FIG. 8, the energy required to convert the batch composition of Example 12 into a glass melt composition was 20% less than the energy required to convert the E-glass batch composition to glass melt composition. The energy required to convert a second E-glass batch composition to a glass melt composition was also compared with the energy required to convert the batch composition of Example 12 into a glass melt composition. The energy required to convert the batch composition of Example 12 was about 33% percent lower than the energy to convert the second E-glass batch composition to a glass melt composition.

Figure 9:
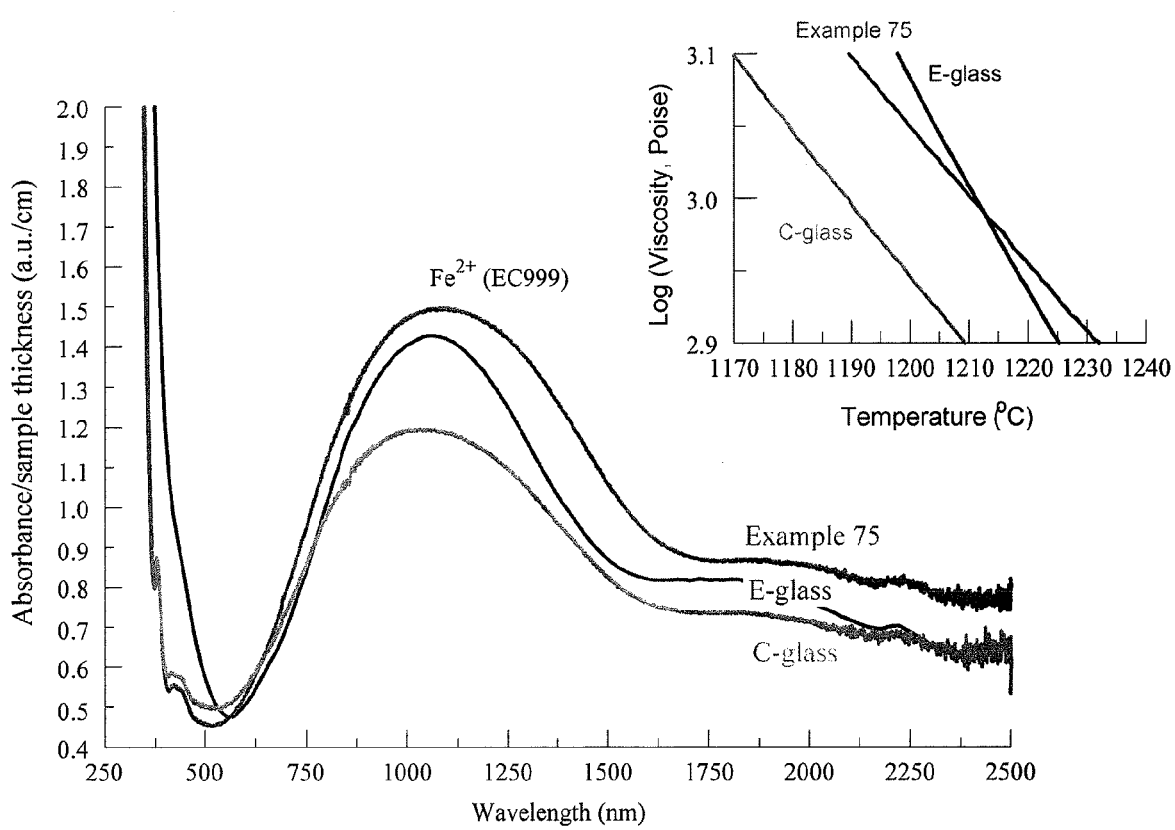
FIG. 9 is a plot of the absorption spectra for a glass composition according to one embodiment of the present invention as well as E-glass and C-glass compositions. The upper corner of FIG. 9 illustrates the temperature-viscosity relationship for the various glasses.

FIG. 9 is a plot of the absorption spectra for the glass composition of Example 75 as well as for an E-glass composition and a C-glass composition. The absorption due to the presence of $Fe^{2+}$ in the compositions is visible as a large broad band located between 700 and 1500 nm. Example 75 has a larger absorption due to $Fe^{2+}$ than either of the other glasses, which indicates that heat will dissipate more quickly from the molten glass which advantageously facilitates the formation of glass fibers for high fiber production throughput needs, as compared with the C-glass sample as both have a similar relationship between viscosity and temperature as shown in the insert of FIG. 9. As illustrated in the viscosity change for the E-glass sample is faster than both the Example 75 and the C-glass samples. Thus, the slightly lower concentration of $Fe^{2+}$ (or the lower absorbance at 1000 nm or lower glass cooling rate) of the E-glass is expected to have a similar throughput as the glass composition according to Example 75, but higher than that of C-glass.

II. Acid and Alkaline Corrosion Resistance

Fibers formed from glass compositions of the present invention were made in a laboratory using a single tip bushing set up. To compare with commercial glass fiber corrosion resistance under the same testing conditions, AR-, C-, ECR- and E-glass fibers were also made using the same method using cullet.

Glass fiber resistance to corrosion was evaluated in terms of the relative sample percent weight loss after leaching test. Testing was administered by boiling a fiber strand at 96° C. for one hour in sulfuric acid or sodium hydroxide solutions under various pH conditions. All of the tests were performed by keeping the ratio of solution volume to the sample mass or volume (5,000 m$^2$) constant. 50 ml of the solution and 1.375 grams of glass fibers (filament diameter –22 μm) were used for each test. Triplicate samples were tested to determine average sample weight losses. The results of the acid and alkaline corrosion resistance testing are provided in Table XII.

TABLE XII

Acid and Alkaline Corrosion Resistance Results (% Weight Loss)

| pH | 0<br>1N<br>$H_2SO_4$ | 2<br>0.1N<br>$H_2SO_4$ | 12<br>0.1N<br>NaOH | 14<br>1N<br>NaOH | Note |
|---|---|---|---|---|---|
| E-glass (1) | 1.02 | 0.19 | 0.29 | 1.24 | 0 $B_2O_3$ |
| E-glass (2) | 1.04 | 0.00 | 0.51 | 0.92 | 1.3 $B_2O_3$ |
| E-glass (3) | 17.79 | | 0.87 | 1.62 | 6.0 $B_2O_3$ |
| ECR | 0.66 | 0.00 | 0.13 | 1.11 | 0 $B_2O_3$ + 4 ZnO |
| C-Glass[2] | 0.09 | 0.13 | 0.36 | 7.83 | 0 $B_2O_3$ |
| AR-Glass I[3] | 0.10 | 0.00 | 0.00 | 0.10 | 17 $ZrO_2$ |
| Ex 10 | 1.12 | 0.21 | 0.84 | 6.42 | Baseline |
| Ex 11 | 3.58 | 0.15 | 0.38 | 5.60 | 1%$ZrO_2$ + 3% $TiO_2$ |
| Ex 12 | 4.38 | 0.21 | 0.62 | 2.23 | 2.9 $ZrO_2$ +<br>1.1% $TiO_2$ |
| Ex 13 | 4.79 | 0.64 | 0.40 | 1.01 | 8% $ZrO_2$ |
| Ex 12 | 0.59 | 0.22 | 0.26 | 8.13 | baseline |
| Ex 38 | 1.50 | 0.09 | 0.68 | 11.02 | |
| Ex 18 | 3.10 | | | | |
| Ex 19 | 0.69 | 0.66 | 0.31 | 8.47 | |
| Ex 57 | 2.20 | | | 2.29 | |
| Ex 58 | 2.75 | | | 3.81 | |
| Ex 59 | 5.35 | | | 5.54 | |
| Ex 63 | 1.64 | | | 2.89 | |
| Ex 67 | 1.35 | | | 3.57 | |
| Ex 71 | 1.19 | | | 3.30 | |

[1]The average determined from three individual tests and standard deviation is not greater than 0.1%.
[2]C-glass (wt %): 66 $SiO_2$, 5.5 $Al_2O_3$, 10.4 CaO, 3.6 MgO, 0.3 $Fe_2O_3$, 0.2 $K_2O$, 12.5 $Na_2O$, 0.5F and 0.2 $SO_3$.
[3]AR-glass (wt %): 57 $SiO_2$, 3.2 $Al_2O_3$, 15 $ZrO_2$, 4.2 CaO, 0.1 MgO, 0.1 $Fe_2O_3$, 0.1 $K_2O$, 12 $Na_2O$, 0.5 F and 0.23 $SO_3$.

The corrosion resistance of glass fibers made from a glass composition according to the embodiment of the present invention in Example 75 was also evaluated in comparison with several E-glass compositions (E-glass compositions with 0 weight % $B_2O_3$, 0.7 weight % $B_2O_3$, and 1.3 weight % $B_2O_3$). Fibers formed from the glass composition of Example 75 were made in a laboratory using a single tip bushing set up. The various E-glass fibers were commercially available glass fibers.

Figure 10:
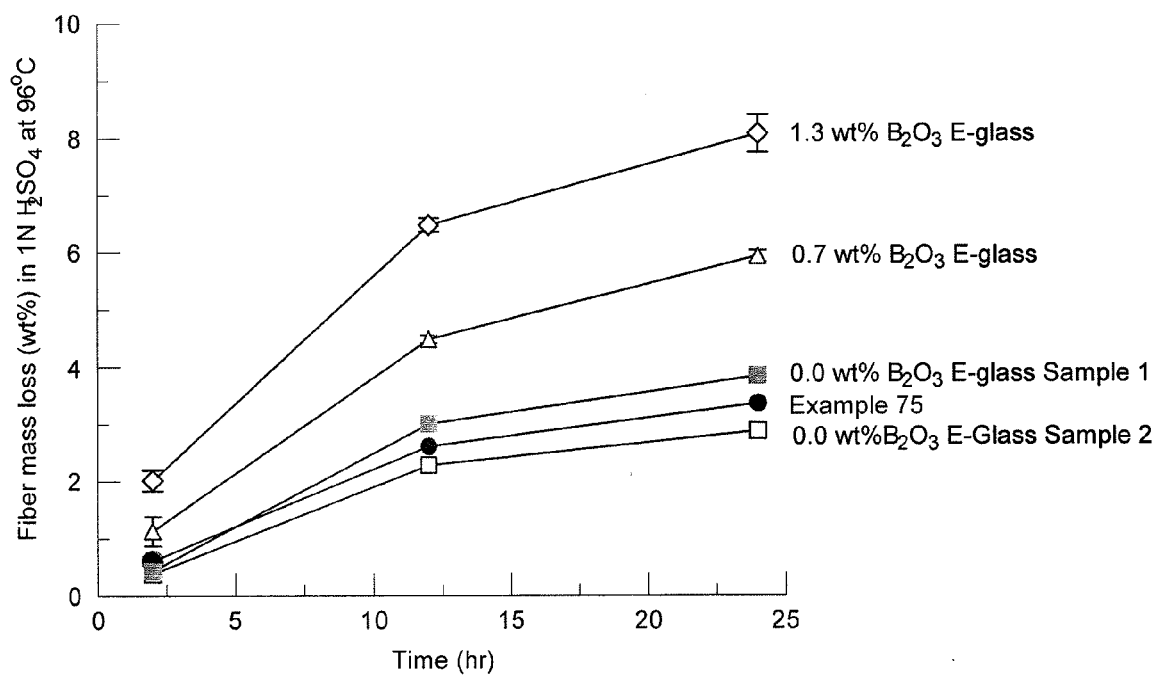
FIG. 10 is a plot illustrating the weight loss over time for a glass composition according to one embodiment of the present invention, as well as for various E-glass compositions, when placed in 1 N $H_2SO_4$.

Glass fiber resistance to corrosion was evaluated in terms of the relative sample percent weight loss after leaching test. Testing was administered by placing a fiber sample in a 1 N $H_2SO_4$ solution at 96° C. for 2, 12, and 24 hour periods. All of the tests were performed by keeping the ratio of solution volume to the sample mass or volume (5,000 m²) constant. 50 ml of the solution and 1.375 grams of glass fibers (filament diameter ~22 μm) were used for each test. Triplicate samples were tested to determine average sample weight losses. FIG. 10 is a plot illustrating the weight loss over time for the glass fiber made from the composition of Example 75 compared to the various E-glass compositions. As shown in FIG. 10, the acid resistance of the glass fiber made from Example 75, according to one embodiment of the present invention, was similar to the boron-free E-glass fiber samples and significantly superior to the boron-containing E-glass fiber samples.

The corrosion resistance of glass fibers made from the glass composition of Example 75 was also compared to the corrosion resistance of 0% $B_2O_3$ E-glass fibers in citric acid as well as sulfuric acid. The glass fibers formed from the glass composition of Example 75 were prepared as described above in connection with FIG. 10. The 0% $B_2O_3$ E-glass fibers were collected from INNOFIBER® CR glass commercially available from PPG Industries, Inc.

Figure 11:
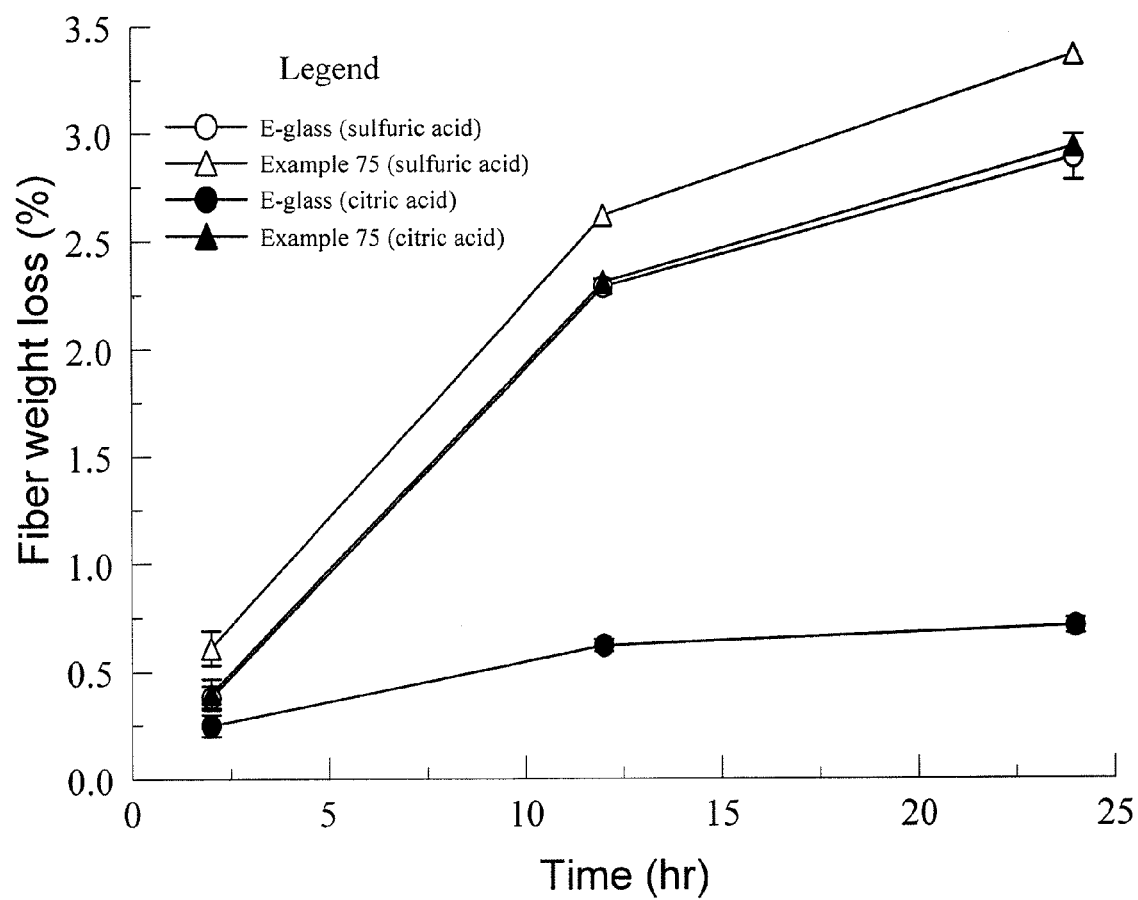
FIG. 11 is a plot illustrating the weight loss over time for a glass composition according to one embodiment of the present invention, as well as for a boron-free E-glass composition, when placed in sulfuric and citric acid solutions.

Glass fiber resistance to corrosion was evaluated in terms of the relative sample percent weight loss after leaching test. Testing was administered by placing a fiber sample in a 1 N $H_2SO_4$ solution at 96° C. for 2, 12, and 24 hour periods. In addition, corrosion resistance to citric acid was evaluated in a separate test by placing a fiber sample in a 50% citric acid solution at 96° C. for 2, 12, and 24 hour periods. All of the tests were performed by keeping the ratio of solution volume to the sample mass or volume (5,000 m²) constant. 50 ml of the solution and 1.375 grams of glass fibers (filament diameter ~22 μm) were used for each test. Triplicate samples were tested to determine average sample weight losses. FIG. 11 is a plot illustrating the weight loss over time for the glass fibers made from the composition of Example 75 compared to the boron-free E-glass fibers. As shown in FIG. 11, the glass fiber made from Example 75, according to one embodiment of the present invention, showed comparable resistance to sulfuric acid to boron-free E-glass fiber samples. The Example 75 glass fiber sample advantageously exhibited a weight loss of ~3-3.5% after 24 hours in both acids.

III. Mechanical Testing

Figure 12:
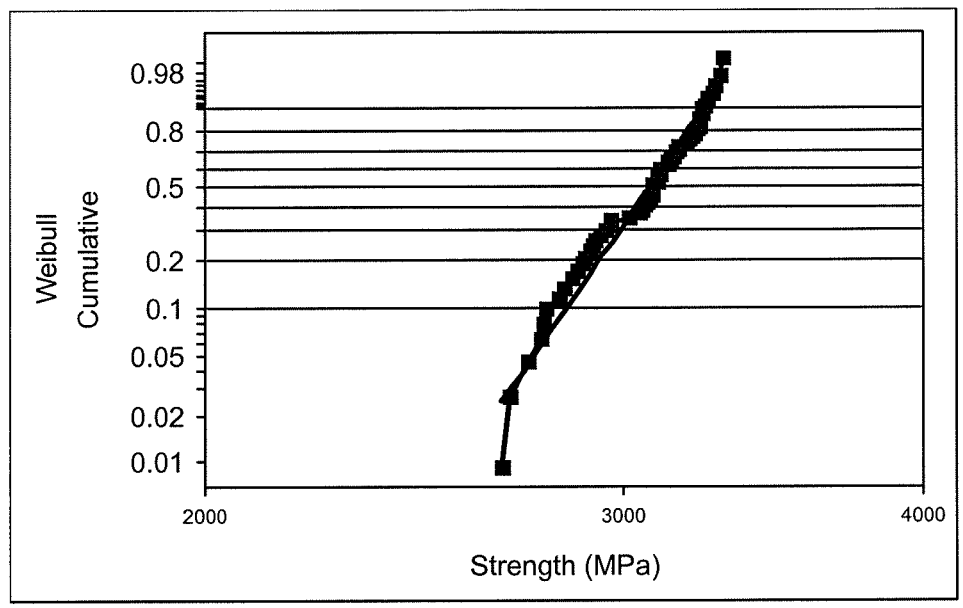
FIG. 12 summarizes Weibull statistical analysis of fiber strengths of various glass compositions according to some embodiments of the present invention.

Tensile strengths of fibers formed from the glass composition of Example 37 of the present invention were measured by drawing 10-um diameter fibers from a single tip bushing in laboratory. The fibers were subsequently tested by applying tensile force to the fibers from both ends within the same day of fiber forming. FIG. 12 summarizes Weibull statistical analysis of the fiber strength with an average of about 3050 MPa and standard error of 22.4 MPa for sample size of 57. Except for the tail, the strength fit the single Weibull distribution well suggesting a single failure mode dominates the fiber failure.

Fiber sonic tensile modulus was measured by drawing 30-um diameter fibers comprising the glass composition of Example 37 of the present invention from a single tip bushing in laboratory. Fiber density was also measured using a pycnometer. The elastic modulus (or Young's modulus) was calculated using $E=\rho C^2$ where E, ρ, and C are modulus, density, and sound velocity, respectively. Fibers of two sets were formed at two different temperatures, the first set at 1000 Poise melt viscosity (Low T Forming) and the second set at 50° C. higher than the first set. (High T Forming) Table XIII summarizes the statistical analysis of the fiber modulus with an average of about 56.8 GPa and 61.5 GPa for low and high forming temperature cases, respectively.

TABLE XIII

| | Sonic Modulus | |
|---|---|---|
| Statistics | Low T Forming | High T Forming |
| Mean (GPa) | 56.79 | 61.47 |
| Std Dev (GPa) | 4.41 | 6.73 |
| Std Err Mean (GPa) | 0.99 | 1.37 |
| upper 95% Mean | 58.86 | 64.31 |
| lower 95% Mean | 54.73 | 58.62 |
| Sample Size N | 20 | 24 |
| Fiber Diameter (μm) | 29.96 ± 0.36 | 30.17 ± 0.42 |
| Fiber Density (g/cm³) | 2.536 ± 0.006 | 2.521 ± 0.028 |

Fibers formed the glass compositions of Examples 75 and 76 were also measured for fiber density, strength, and modulus using the same methods described above. Table XIV provides the mean values for density, tensile strength and modulus for these fibers.

TABLE XIV

| Example | 75 | 76 |
|---|---|---|
| Density (g/cm³) | 2.54 | 2.53 |
| Strength (MPa) | 3150 | 2990 |
| Modulus (GPa) | 73.37 | 72.70 |

Fibers formed from the glass compositions of Examples 37, 75 and 76 exhibited good mechanical properties. Fibers formed from the glass compositions of Example 75 and 76, for example, exhibited strength and modulus values similar to E-glass fibers.

IV. Hydrolytic Resistance

Figure 13:
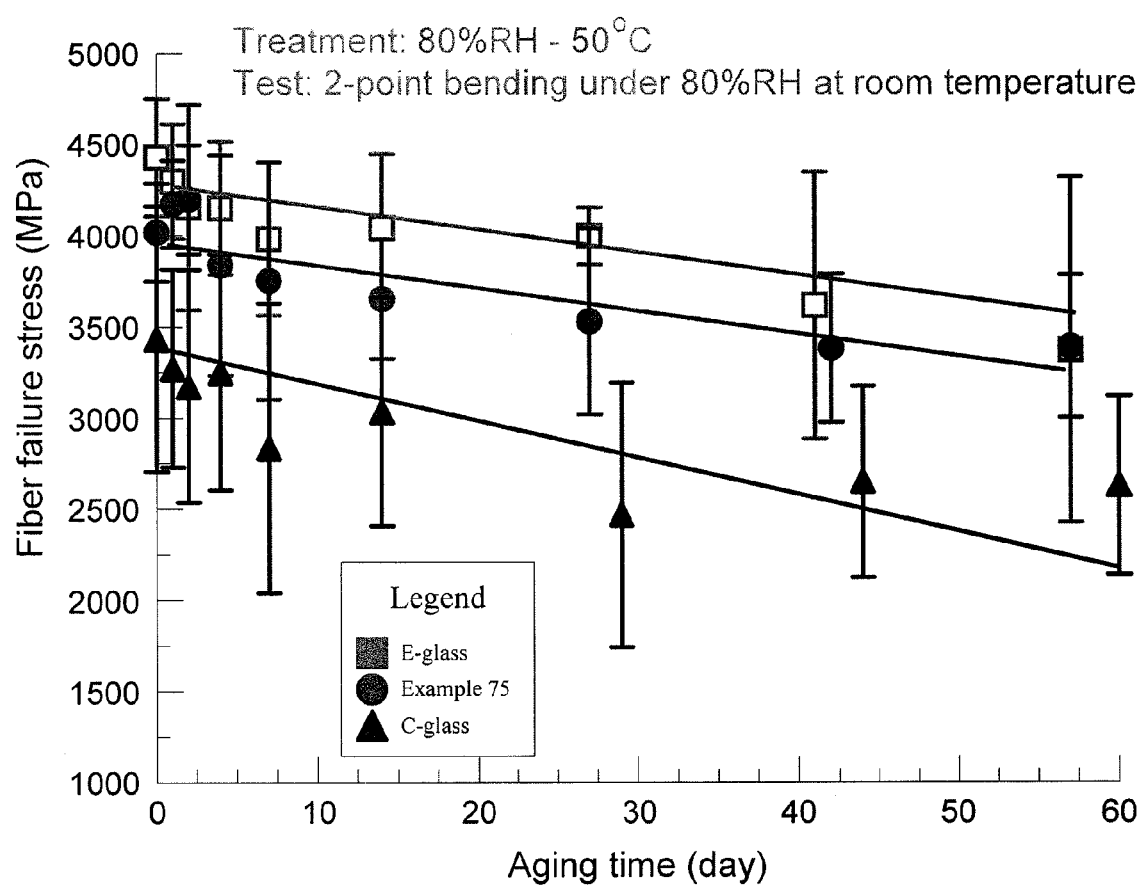
FIG. 13 is a plot illustrating the hydrolytic resistance for a glass composition according to one embodiment of the present invention, as well as E-glass and C-glass compositions.

The hydrolytic resistance of glass fibers according to the embodiment of the present invention of Example 75 was evaluated in relation to E-glass fibers and C-glass fibers. The glass fibers were treated in 80% relative humidity at 50° C. for an extended period of time in a humidity and temperature controlled oven. At various times, the fiber failure strain of the fibers at a time of fiber breakage was measured using a two-point bending procedure similar to the procedure described in S. T. Gulati, "Strength Measurement of Optical Fibers by Bending," J. Am. Ceram. Soc., 69[11] 815-21 (1986). From the failure strain, fiber strength (or stress at failure) was calculated using Hooke's Law (using a fiber modulus values from the separate measurement by the sonic method described above). For each glass composition at a given treatment time, 20 samples were tested. During the test at room temperature, the chamber of the two-point bending apparatus was controlled at a humidity of 50%. FIG. 13 is a plot illustrating the hydrolytic resistance of the fibers by showing the fiber failure stress values over time for the Example 75 glass fibers, the C-glass fibers, and the E-glass fibers. The slopes of the lines represent the resistances of the fibers to hydrolysis by moisture (water). The C-glass fibers had a higher slope than both the Example 75 glass fibers and the E-glass fibers, which indicates that the C-glass fibers have a lower resistance to moisture (water) attack. On the other hand, similar slopes were found for both the E-glass fibers and the Example 75 glass fibers. The slopes of both the Example 75 glass fibers and the E-glass fibers were also less than that of the C-glass fibers. In short, the Example 75 glass fibers demonstrated a higher hydrolytic resistance to moisture (water) attack than the C-glass fibers, as well as a hydrolytic resistance to moister (water) comparable to that of the E-glass fibers.

V. Exemplary Chopped Strand Applications

One advantage of glass fibers according to some embodiments of the present invention is that the fibers can be formed using furnaces, forehearths, bushings, and/or other fiber-forming equipment used in the production of E-glass. Table XV illustrates various fiber glass strands according to some embodiments of the present inventions that were manufactured using E-glass fiber-forming equipment and potential applications in which the fibers could be used. The glass fibers were formed from the glass composition of Example 75. The glass fibers according to Example 75 were formed using a 200-tip bushing as a pilot trial using convention commercial fiber glass manufacturing equipment used in the production of E-glass fibers.

TABLE XV

Glass Fiber Samples

| Sample No. | Yardage | Fiber Diameter (microns) | LOI (%) | Moisture (%) | Application |
|---|---|---|---|---|---|
| 1 | 7336 | 18.247 | 0.1 | 7.2 | Wet Chop - Light Weight |
| 2 | 7849 | 17.575 | 0.2 | 8.2 | Wet Chop - Roofing |
| 3 | 7591 | 17.758 | 0.46 | N/A | Chop Strand - Thermoplastic Resin 1 |
| 4 | 7623 | 17.493 | 0.57 | N/A | Chop Strand - Thermoplastic Resin 2 |
| 5 | 4510 | 20.275 | 0.1 | 7.6 | Wet Chop - Light Weight |
| 6 | 4588 | 20.921 | 0.1 | 6.2 | Wet Chop - Roofing |

In connection with potential uses of glass fibers according to some embodiments of the present invention in wet chop applications, a variety of wet chop handsheets were generated using varying amounts of E-glass fibers and glass fibers formed from the glass composition of Example 75 ("Ex. 75 Glass"): 100% E-glass, 75% E-glass and 25% Ex. 75 glass, 50% E-glass and 50% Ex. 75 glass, 25% E-glass and 75% Ex. 75 glass, and 100% Ex. 75 glass. The glass fiber samples for the handsheet formation are shown in Table XVI below.

TABLE XVI

| Fiber Properties | Ex. 75 Glass | E-Glass |
|---|---|---|
| Filament Diameter (Avg microns) | 18.25 | 16.50 |
| Sizing Chemistry | Roofing | Roofing |
| Sizing LOI (Avg, %) | 0.10 | 0.16 |
| Chop Length (Avg, mm) | 35.00 | 35.00 |

The wet chop handsheets were formed using conventional techniques by dispersing the specified amount of glass fibers in a white water slurry to form a mat. The white water slurry included a thickening agent (water-soluble hydroxyethylcellulose (Natrasol 250HR), a pH modifier (ammonium hydroxide), a wetting agent (Katapol cationic emulsifier), an adhesive (lignin), and water. After the mat was formed, a conventional urea-formaldehyde binder was applied. The mat was then dried. The finished mat comprised 80-85% fibers and 15-20% binder by weight.

Various properties of the finished mats were measured and are reflected in Table XVII below.

TABLE XVII

Handsheet Performance

| | Unit | 100% E-glass | 75% E-glass 25% Ex. 75 glass | 50% E-glass 50% Ex. 75 glass | 25% E-glass 75% Ex. 75 glass | 100% Ex. 75 glass |
|---|---|---|---|---|---|---|
| Fabric Basis Weight (ASTM D3776) | oz/ft$^2$ | 5.69 | 5.99 | 5.82 | 5.77 | 5.84 |
| Fabric Thickness (ASTM D1777) | inch | 0.022 | 0.023 | 0.023 | 0.024 | 0.023 |
| Mullen Burst (ASTM D3786) | PSI | 74 | 70 | 52 | 56 | 55 |
| Air Permeability (ASTM D737) | scfm/ft$^2$@0.5 wg | 290.44 | 308.72 | 318.54 | 332.28 | 344.28 |
| Tensile Strength - Machine Direction (ASTM D5035) | MPa | 94.54 | 72.26 | 62.81 | 21.4 | 45.93 |
| Tensile Strength - Cross Machine Direction (ASTM D5035) | MPa | 186.26 | 69.92 | 49.78 | 67.68 | 77.78 |
| Resin LOI, Loss on Ignition (ASTM D4963) | % | 16.79 | 16.37 | 17.63 | 16.42 | 16.84 |
| Color - Yellow Index (ASTM D6290) | Y.I. | 11.63 | 11.27 | 11.02 | 10.6 | 10.14 |
| Color - White Index (ASTM D6290) | W.I. | 44.7 | 45.61 | 46.32 | 47.33 | 48.24 |

Desirable characteristics, which can be exhibited by embodiments of the present invention, can include, but are not limited to, the provision of new glass compositions that utilize glassy minerals; the provision of new glass compositions that utilize perlite; the provision of batch compositions requiring less energy to form melts of glass compositions; the provision of new glass compositions demonstrating significant differences in liquidus and forming temperatures; the provision of glass fibers having reduced weights without a concomitant reduction in mechanical properties; the provision of glass fibers demonstrating desirable acid and alkaline corrosion resistance properties, the provision of glass fibers that can be used in a variety of end-use applications, and others.

It is to be understood that the present description illustrates aspects of the invention relevant to a clear understanding of the invention. Certain aspects of the invention that would be apparent to those of ordinary skill in the art and that, therefore, would not facilitate a better understanding of the invention have not been presented in order to simplify the present description. Although the present invention has been described in connection with certain embodiments, the present invention is not limited to the particular embodiments disclosed, but is intended to cover modifications that are within the spirit and scope of the invention, as defined by the appended claims.

That which is claimed:

1. A plurality of glass fibers, wherein each glass fiber comprises:
   53 to less than 62 weight percent $SiO_2$;
   8-12 weight percent $Al_2O_3$;
   0-3 weight percent ZnO;
   greater than 0 to 3 weight percent $TiO_2$;
   8.5-18 weight percent alkali metal oxide ($R_2O$) component;
   a metal oxide (RO) component selected from the group consisting of MgO, CaO, SrO, BaO, and ZnO, wherein the metal oxide component is present in an amount to provide a mass ratio of $R_2O$/RO ranging from about 0.28 to about 1.7; and
   less than 1 weight percent of $Fe_2O_3$.

2. The plurality of glass fibers of claim 1, wherein the glass fibers have a length of less than about 105 millimeters.

3. The plurality of glass fibers of claim 1, wherein the glass fibers have a length of less than about 13 millimeters.

4. The plurality of glass fibers of claim 1, wherein the glass fibers have a length of greater than about three millimeters.

5. The plurality of glass fibers of claim 1, wherein the glass fibers have a length of greater than about fifty millimeters.

6. A fiber glass strand comprising the plurality of glass fibers of claim 1.

7. A roving comprising the plurality of glass fibers of claim 1.

8. A yarn comprising the plurality of glass fibers of claim 1.

9. A woven fabric comprising the plurality of glass fibers of claim 1.

10. A non-woven fabric comprising the plurality of glass fibers of claim 1.

11. The plurality of glass fibers of claim 1, wherein each glass fiber comprises 0-3 weight percent $MnO_2$.

12. A polymeric composite comprising:
    a polymeric material; and
    the plurality of glass fibers of claim 1.

13. The polymeric composite of claim 12, wherein the plurality of glass fibers have a length of less than about 105 millimeters.

14. The polymeric composite of claim 12, wherein the plurality of glass fibers have a length of less than about 13 millimeters.

15. The polymeric composite of claim 12, wherein the plurality of glass fibers have a length of greater than about fifty microns.

16. The polymeric composite of claim 12, wherein the plurality of glass fibers have a length of greater than about fifty millimeters.

17. The polymeric composite of claim 12, wherein the plurality of glass fibers are in the form of a non-woven fabric.

18. The polymeric composite of claim 12, wherein the plurality of glass fibers are in the form of a woven fabric.

19. The polymeric composite of claim 12, wherein the polymeric material comprises a thermoplastic polymer.

20. The polymeric composite of claim 12, wherein the polymeric material comprises a thermosetting polymer.

21. A roofing product comprising the plurality of glass fibers of claim 1.

22. A plurality of glass fibers, wherein each glass fiber comprises:
    53-64 weight percent $SiO_2$;
    greater than 10 to 14 weight percent $Al_2O_3$;
    0-3 weight percent ZnO;
    greater than 0 to 3 weight percent $TiO_2$;
    10-18 weight percent alkali metal oxide ($R_2O$) component;
    a metal oxide (RO) component selected from the group consisting of MgO, CaO, SrO, BaO, and ZnO, wherein the metal oxide component is present in an amount to provide a mass ratio of $R_2O$/RO ranging from about 0.38 to about 1.7; and
    less than 1 weight percent of $Fe_2O_3$.

* * * * *